US011023834B2

(12) United States Patent
Moolman et al.

(10) Patent No.: US 11,023,834 B2
(45) Date of Patent: *Jun. 1, 2021

(54) COLLABORATIVE DESIGN SYSTEMS, APPARATUSES, AND METHODS

(71) Applicant: SourceCode Technology Holdings, Inc., Bellevue, WA (US)

(72) Inventors: Riaan Moolman, Roodepoort (ZA); Wynand Coenraad Du Toit, Johannesburg (ZA); Norman Anderson, Roodepoort (ZA); Eric Johnson Schaffer, Bellevue, WA (US); Grant Dickinson, Bellevue, WA (US); Jacobus Hendrik du Preez, Snoqualmie, WA (US); Olaf Alexander Wagner, Issaquah, WA (US); Adriaan van Wyk, Snoqualmie, WA (US)

(73) Assignee: K2 SOFTWARE, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,849

(22) Filed: May 18, 2020

(65) Prior Publication Data

US 2020/0349486 A1 Nov. 5, 2020

Related U.S. Application Data

(63) Continuation of application No. 15/899,891, filed on Feb. 20, 2018, now Pat. No. 10,657,474.
(Continued)

(51) Int. Cl.
*G06Q 10/06* (2012.01)
*G06Q 10/10* (2012.01)
(Continued)

(52) U.S. Cl.
CPC ......... *G06Q 10/06313* (2013.01); *G06F 8/34* (2013.01); *G06F 8/38* (2013.01);
(Continued)

(58) Field of Classification Search
CPC ...... G06F 3/0484; G06F 8/38; G06F 9/44529; G06F 16/958; G06F 8/34; G06F 30/00;
(Continued)

(56) References Cited

U.S. PATENT DOCUMENTS 7,403,948 B2 7/2008 Ghoneimy et al.
8,832,175 B2 9/2014 du Preez et al.
(Continued)

OTHER PUBLICATIONS

Search and Examination Report dated Aug. 15, 2018 issued for United Kingdom Patent Application No. GB1802728.4.
(Continued)

*Primary Examiner* — Marina Lee
(74) *Attorney, Agent, or Firm* — K&L Gates LLP

(57) ABSTRACT

A collaborative design system, method, and apparatus are disclosed. An example method includes receiving request messages from a first client device and a second client device requesting a workflow project for design collaboration, creating an un-executable version of the workflow project from an executable version of the workflow project, and transmitting a copy of the un-executable version of the workflow project to each of the client devices. The method further includes receiving from the first client device, an instruction that is indicative of a modification to the copy of the un-executable version of the workflow project at the first client device and transmitting the instruction to the second client device causing the second client device to modify the copy of the un-executable version of the workflow project at
(Continued)

the second client device. Additionally, the method includes modifying the executable version of the workflow project based on the instruction.

20 Claims, 22 Drawing Sheets

Related U.S. Application Data

(60) Provisional application No. 62/461,617, filed on Feb. 21, 2017.

(51) Int. Cl.

| | | |
|---|---|---|
| *G06F 9/455* | (2018.01) | |
| *G06F 8/38* | (2018.01) | |
| *G06F 8/34* | (2018.01) | |
| *G06F 16/958* | (2019.01) | |
| *G06F 30/00* | (2020.01) | |
| *G06F 111/02* | (2020.01) | |
| *G06F 3/0484* | (2013.01) | |
| *H04L 29/06* | (2006.01) | |

(52) U.S. Cl.
CPC ........ *G06F 9/45529* (2013.01); *G06F 16/958* (2019.01); *G06F 30/00* (2020.01); *G06Q 10/101* (2013.01); *G06F 3/0484* (2013.01); *G06F 2111/02* (2020.01); *H04L 65/403* (2013.01)

(58) Field of Classification Search
CPC . G06F 2111/02; H04L 65/403; G06Q 10/101; G06Q 10/06313
See application file for complete search history.

(56) References Cited

U.S. PATENT DOCUMENTS

| | | | |
|---|---|---|---|
| 1,019,227 A1 | 1/2019 | Morse et al. | |
| 10,657,474 B2 * | 5/2020 | Moolman | ............. G06F 16/958 |
| 2002/0075293 A1 | 6/2002 | Charisius et al. | |
| 2002/0188597 A1 * | 12/2002 | Kern | ..................... G06Q 30/06 |
| 2007/0198542 A1 | 8/2007 | Morris | |
| 2010/0146060 A1 * | 6/2010 | Graham | ................ A63F 13/352 |
| | | | 709/206 |
| 2013/0120368 A1 * | 5/2013 | Miller | ..................... G06T 19/00 |
| | | | 345/419 |
| 2013/0144566 A1 | 6/2013 | De Biswas | |
| 2013/0297468 A1 | 11/2013 | Hirsch et al. | |
| 2014/0258969 A1 * | 9/2014 | Brown | ..................... G06F 8/30 |
| | | | 717/103 |
| 2014/0337760 A1 | 11/2014 | Heinrich et al. | |
| 2018/0247243 A1 * | 8/2018 | Moolman | ................. G06F 8/34 |

OTHER PUBLICATIONS

European Search Report and Opinion dated Jul. 26, 2018 issued for European Patent Application No. 18157706.5.

* cited by examiner

COLLABORATIVE DESIGN SYSTEMS, APPARATUSES, AND METHODS

PRIORITY CLAIM

The present application is a continuation of, claims priority to and the benefit of U.S. patent application Ser. No. 15/899,891, filed on Feb. 20, 2018, now U.S. Pat. No. 10,657,474, which claims priority to and the benefit of U.S. Provisional Patent Application No. 62/461,617, filed on Feb. 21, 2017, the entirety of which are incorporated herein by reference and relied upon.

BACKGROUND

Online project collaboration is oftentimes associated with unfriendly user interfaces, limited functionality, cumbersome tools, and system freezes/lag. For instance, known collaboration applications (e.g., circuit design applications and mechanical design applications) enable multiple users to view and edit the same project. However, these known software applications generally require that each user have a copy of the software application installed on their own device or workstation. The separate software applications enable each user to have access to a complete version (or at least a basic version) of the project toolset and an executable version of the project, which is oftentimes stored in a single location on a host user's workstation or on a centrally located server. During collaboration, user devices access the project located on the host workstation or at the central server. Limited bandwidth at the host may create lag during the collaboration, leading to increasingly frustrated users. In addition, some features of a toolset may be restricted from being used for online collaboration as a result of complexities related to propagating project changes (caused by the tool) to other devices. This is especially true for viewer versions of an online collaboration application that do not include complete toolsets.

Another issue with these known online collaboration applications is that collaboration is limited to only those devices that have a copy of the software application. This may be acceptable within enterprises and closed domain environments where all devices are under information technology ("IT") management and can be updated with the latest version of the online collaboration application. However, this is not acceptable for devices outside the enterprise or closed domain that do not have the application installed. As workforces become more mobile and some workforces using more independent contractors, limiting online project collaboration to devices with the appropriate project software application is not feasible.

Some applications attempt to overcome these known problems by being configured to provide online collaboration for a single file or document type. For instance, many cloud-based online collaboration tools are provided only for a specific application, such as a word processing application, a spreadsheet application, a presentation application, or a database application. While such applications are generally efficient, they limit collaboration to a single document or file, thereby limiting functionality to the capability of the document/file. These applications are generally not useful for online collaboration for more sophisticated uses, such as the creation of executable programs, workflows, or object-oriented programs.

SUMMARY

The present disclosure provides a new and innovative system, method, and apparatus for online collaboration for the creation and modification of a workflow project (e.g., a form, object-oriented program/process, connected business objects, etc.). The example system, method, and apparatus described herein provide online collaboration by creating a separation between a runtime environment of a workflow project and an un-executable version of the workflow project. The separation enables changes to the workflow project to be recorded (within instruction sets) during a collaborative session and propagated in real-time among client devices. The instruction sets enable client devices to provide a current real-time view of a state of a project without each device having to separately apply the changes to an executable version of the project or transmit entire copies of a project. Instead, only the modifications are communicated and made at each device and reflected within an editable, but non-executable version of the project. The disclosed collaboration environment enables editing and execution of a workflow project by any of the client devices during a session.

In addition to modifying local un-executable versions of a workflow project at client devices, the instruction sets disclosed herein are also used to modify an executable version of the workflow project, which is generally located at a centralized location or a client device. However, since modification of the executable version is relatively more computationally intensive than modification of a non-executable version of the workflow project, the modifications are made in the background and generally unnoticed by client devices. At any time, a client device may transmit an execution request to a hosting device that contains the executable version of the workflow project. The request causes the workflow project to execute, with the result(s) of the execution being transmitted to the client devices in the collaborative session. The transmission of the results to the client devices provides the appearance that each device has an executable version of the workflow project when in fact the executable version is located centrally or only at one device.

The above-described collaborative configuration uncouples an executable version of a workflow project from client devices, thereby enabling the workflow project to be displayed and edited in third-party programs and applications (e.g., web browsers) that are not specifically configured for the executable version of a project. This uncoupling accordingly permits collaboration of a workflow project among users without the need to install project-specific software on their devices. Further, third-party functionality may be integrated with the un-executable version of the workflow project since the un-executable version is generally in a format that is more prevalent in third-party applications. For example, an un-executable version of a workflow project may be integrated with a third-party messaging or email application that is used to provide certain users alerts or notification messages when approval or help is needed by another user in the collaboration environment.

In an embodiment, a collaborative design apparatus includes a persistent memory configured to store an executable version of a workflow project, the workflow project including at least one executable version of an object-orientated process having attributes and properties. The collaborative design apparatus also includes a model processing server configured to compile and execute the workflow project based on the attributes and properties of the executable version of object-orientated process. The collaborative design apparatus further includes an abstraction interface configured to define a mapping between (i) the executable version of the object-oriented process and a typescript version of the object-orientated process including related attributes and properties, and (ii) the executable version of the workflow project and a typescript version of the workflow project, where the typescript version of the object-orientated process and the typescript version of the workflow project are compatible for display in a web browser.

The collaborative design apparatus additionally includes an intermediary processing engine configured to transmit the typescript version of the object-orientated process and the typescript version of the workflow project to a first client device for display in the web browser of the first client device and a second client device for display in the web browser of the second client device and transmit a toolset file to the first client device and the second client device, the toolset file specifying a user interface to enable modification of the typescript version of the object-orientated process and the typescript version of the workflow project. The intermediary processing engine is also configured to receive, from the first client device, a modify instruction to modify at least one of the attributes or properties of the typescript version of the object-orientated process and store the modify instruction in conjunction with the typescript version of the object-orientated process. The intermediary processing engine is further configured to transmit the modify instruction to the second client device causing the user interface to modify the at least one of the attributes or properties of the typescript version of the object-orientated process displayed within the user interface at the second client device. The typescript version of the object-orientated process is concurrently displayed, at the first client device and the second client device, with the modification of the at least one of the attributes or properties.

In another embodiment, a collaborative design method includes receiving, in a server, a first request message from a first client device requesting a workflow project and receiving, in the server, a second request message from a second client device requesting the workflow project. The method also includes creating, via the server, a typescript version of the workflow project from an executable version of the workflow project and transmitting, from the server, a first copy of the typescript version of the workflow project to the first client device and a second copy of the typescript version of the workflow project to the second client device. The example method further includes receiving, in the server from the first client device, a modify instruction that is indicative of a modification to the first copy of the typescript version of the workflow project and transmitting, from the server, the modify instruction to the second client device causing the second client device to modify the second copy of the typescript version of the workflow project. Moreover, the example method includes modifying, via the server, the executable version of the workflow project based on the modify instruction.

Additional features and advantages of the disclosed system, method, and apparatus are described in, and will be apparent from, the following Detailed Description and the Figures.

BRIEF DESCRIPTION OF THE FIGURES

FIG. 5 shows a table representative of a workflow project or object partitioned into granular sections representative of modifications by respective instructions, according to an example embodiment of the present disclosure.

FIG. 14 shows a diagram of a table illustrating changes made to JSON model of the email object to add the 'important' property, according to an example embodiment of the present disclosure.

DETAILED DESCRIPTION

Figure 1:
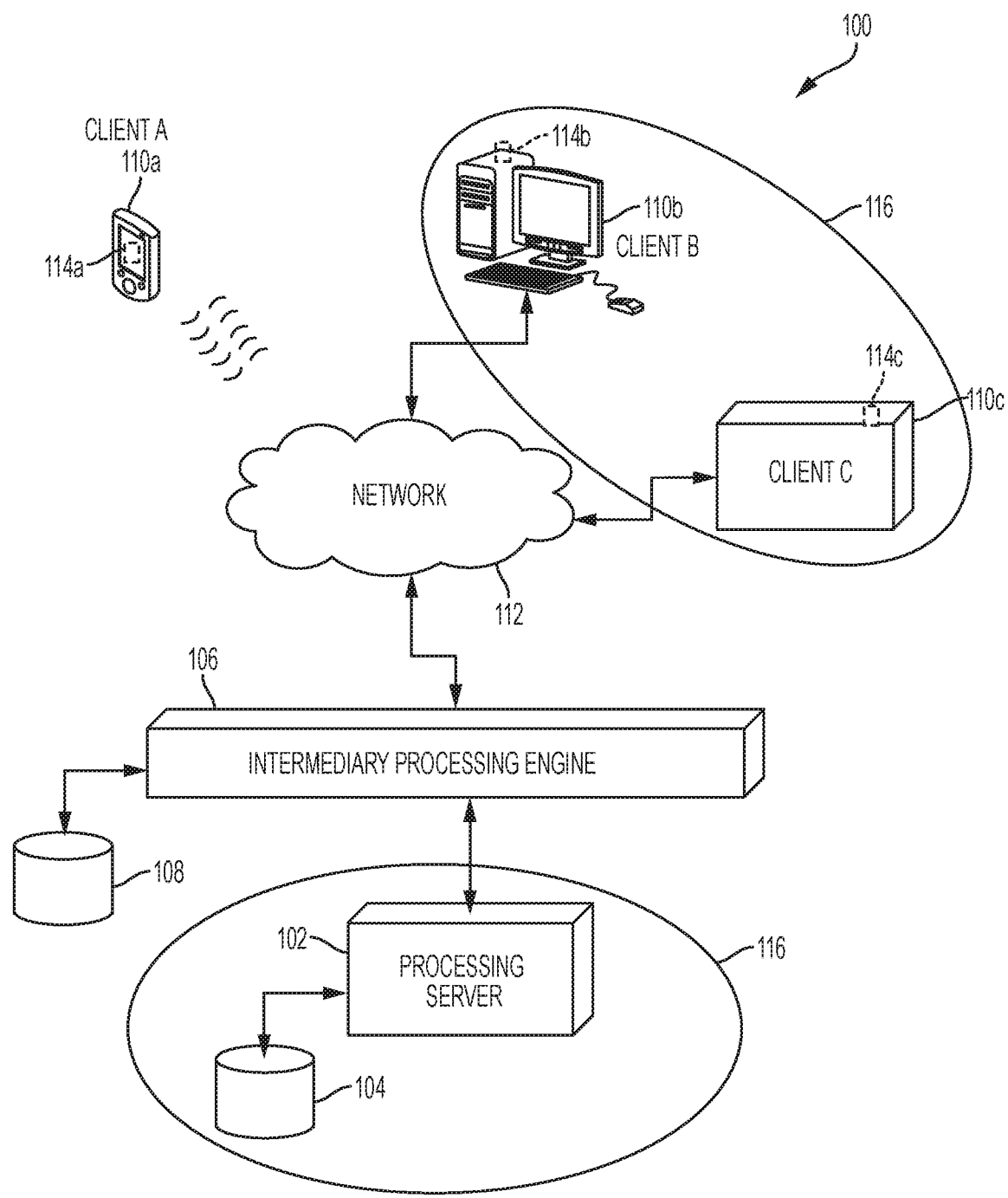
FIG. 1 shows a diagram of an example online collaboration environment, according to an example embodiment of the present disclosure.

The present disclosure relates in general to a method, apparatus, and system for online collaboration for workflow projects. In particular, the example method, apparatus, and system disclosed herein are configured to implement an interface that creates and maps an un-executable version of a workflow project (and included objects/processes) to an executable version. The un-executable version of a workflow project may include one or more un-executable or typescript version of object-orientated processes. The un-executable version is provided in a first programming language that is configured to display web-based information. For example, the un-executable version of the workflow project (including representations of underlying processes/methods/operations) may be specified in TypeScript, eXtensible Markup Language ("XML"), HyperText Markup Language ("HTML"), JavaScript, Cascading Style Sheet ("CSS"), and/or other markup or script-based language that is compatible with a web browser or other user interface-centric application. The specification of the un-executable version of the workflow project in a markup or script-based language enables the project to be operated (including all features and toolsets) on virtually any smartphone, tablet computer, smart-eyewear, smartwatch, laptop computer, workstation, etc.

By comparison, the executable version of a workflow project (including objects/processes) are provided in a second programming language that is configured to execute one or more processes, methods, or procedures to generate a result. The executable version of a workflow project may include an executable version of an object-orientated process. Additionally, the executable version of the workflow project may be specified by, for example C # classes. Further, the executable version of a workflow project is configured to be located at a centralized server/workstation or at a hosting client device. In some embodiments, the executable version workflow project provides one or more results when executed, with the results being transmitted to the un-executable versions. Locating the executable version of the workflow project at a single location reduces processing requirements and specialization of the client devices. Only the device executing the project has to include a specialized software application capable of executing, for example, C # classes in a runtime environment.

The example interface disclosed herein manages the propagation of changes to the workflow project such that they are updated in the un-executable version to enable subsequent editing by users of local copies of the workflow project. At approximately the same time or shortly thereafter, the interface applies the changes to the executable version of the project. Accordingly, the disclosed interface synchronizes un-executable version changes made by multiple client devices among not only the client devices but also the executable version of the workflow project. Further, only the modifications to a workflow project are transmitted, instead of copies of the workflow projects themselves, thereby reducing bandwidth.

Reference is made through to instructions and instruction sets that specify changes to a project. As described herein, instructions and instruction sets capture changes to a project made by client devices. The changes specify, for example, an addition or removal of an object-orientated process or business object to a project, a modification, addition, or removal of a property of an object-orientated process or business object, a modification, addition, or removal of an attribute of an object-orientated process or business object, a modification, addition, or removal of a field of an object-orientated process or business object, and/or a modification, addition, or removal of a link to an object-orientated process or business object. The changes are defined within the instruction sets, which are aggregated in a centralized location (e.g., a server interface or hosting client device). The aggregated instruction sets are compiled and transmitted to each client device that is part of the online collaboration of the project. Each client device applies the instruction sets to an appropriate portion of the project, thereby updating the project to reflect changes made by each of the users. The instruction sets may also be converted into executable instructions for modifying the executable version of the workflow project. The converted instruction sets are propagated down and applied to the executable version. Accordingly, the executable version of the workflow project reflects changes made by users in near-real time while being logically separated from the non-executable versions being modified by the users.

Reference is also made throughout to workflow projects. As disclosed herein, a workflow project is programmatically defined by one or more computer-readable instructions that specify certain methods or actions compartmentalized within discrete computing objects. Workflow projects may be displayed or operated within an object-oriented programming environment in which one or more objects are interconnected to achieve a certain tangible result or output. An object may be specified by attributes and/or properties that define how certain data is to be acquired, processed, and/or output. In addition to above, a workflow project may also include a form with fields and properties. Moreover, a workflow project may include a smartobject that includes a nested workflow or process.

In contrast to the method, apparatus, and system disclosed herein, known online collaboration of project software is susceptible to freezing and pausing of a project. For instance, known project software has a local version of an executable version of a project at each client device within the online session. This known software does not have a non-executable version. Changes made to a project, from any users, are applied directly to an executable version of the project at each client device. This means that the executable version of the project has to be recompiled after each change (or at least before a run/view) command is received at each client device. Recompiling can take time and cause the project to freeze or pause at times during the collaboration, which can be frustrating to users. This can be especially frustrating when one user is compelled to re-execute a project after every change. Further, execution of the project may cause the respective software applications to temporarily prevent (e.g., lock out) other users from making changes until the project is recompiled and/or executed.

The example method, apparatus, and system are configured to overcome issues with known project software collaboration by separating an executable version of a project workflow from an un-executable version, which is formatted for display and interaction in a user interface. The example method, apparatus, and system provide a level of viewable and editable abstraction that enables the underlying executable version of the project workflow to be distributed and changed (through the un-executable version) without having to distribute a specific program designed to execute the workflow project. In other words, the example method, apparatus, and system provide a rendering of a workflow project to users in a collaborative environment that makes it appear the users are interacting with the executable version.

In some embodiments, the example method, apparatus, and system provide graphical editing of the un-executable version of the workflow project. The client devices provide a visualization of a declarative model of the workflow project. This enables a visual editing environment for workflow projects with a visual authoring canvas, which can be plugged into many known third-party applications for online collaboration or operated in conjunction with third-party applications. Further, the authoring canvas of the workflow project is free-flowing, where objects can be placed and linked throughout. By comparison, known graphical editing tools are limited to files, such as documents and spreadsheets, which are locked by coordinates and/or paragraphs.

As discussed herein, the example method, apparatus, and system enable objects in a workflow project to be persisted and run while the online collaboration is ongoing. Further, a workflow project may be simulated to view effects of changes without making the changes live. The elements of the workflow project (e.g., a visualization of a declarative model) can be manipulated by any user of the collaboration and made immediately available to the other users. Further, the workflow project may be nested or layered to collaboratively build business objects (e.g., smartobjects), forms, and/or higher order workflows.

I. Online Collaboration Environment Embodiment

The example method, apparatus, and system disclosed herein are embodied within an online collaboration environment 100, illustrated in FIG. 1. The example environment 100 includes a processing server 102 configured to execute one or more workflow projects that are stored in a memory 104. As provided in more detail below, workflow projects define one or more actions, properties, fields, and/or attributes that are executable within defined classes and/or code. A workflow project may include a workflow having one or more interconnected workflow objects that each specify a method or action. The example processing server 102 includes one or more processors and/or applications configured to execute the code specified by the objects within a workflow project. For example, the processing server 102 may be configured to instantiate and/or execute a workflow project in which objects are specified or defined by C # classes.

The example environment 100 also includes an intermediary processing engine 106 that is communicatively coupled to the processing server 102. In some embodiments, the intermediary processing engine 106 may be part of the server 102. In other embodiments, the intermediary processing engine 106 is separate from the server 102. For example, the intermediary processing engine 106 may be implemented within a cloud computing environment while the server 102 is located at a central location. In an embodiment, the intermediary processing engine 106 may be located in an open domain while the server 102 is located behind a firewall and/or secure gateway in a closed domain.

The example intermediary processing engine 106 is configured to map an executable version of a workflow project (stored at the memory 104) that is provided in a first language to an un-executable version of the workflow project that is provided in a second language. For example, the intermediary processing engine 106 is configured to map or provide conversion of a C # based workflow project (including objects) to a TypeScript workflow project. The mapping includes defining a structure of properties and attributes of a non-executable version of each object, form, and action in a workflow that correlates or matches a structure of properties and attributes of an executable version of the corresponding object, form, and action. The mapping also includes providing a same set of available features, properties, and/or attributes between the executable and un-executable version of the object, form, and/or action such that modifications to the un-executable versions can be propagated to the executable versions. The mapping may be coded within one or more APIs (e.g., Authoring Framework APIs) and/or intermediate models (e.g., an abstraction interface) that correlate typescript (e.g., JSON) code to C # code. The example intermediary processing engine 106 is configured to store an un-executable version of a workflow project, including objects, forms, and/or actions within a memory 108.

As illustrated in FIG. 1, the intermediary processing engine 106 is communicatively coupled to client devices 110 via a network 112 (e.g., the Internet). The network 112 may include any local area network, wide area network, private network, wired network, and/or wireless network (e.g., a cellular and/or Wi-Fi network). The client devices 110 include any smartphone, tablet computer, smart-eyewear, smartwatch, laptop computer, desktop computer, workstation, processor, server, etc. The client devices 110 are configured to operate an application 114 (e.g., a web browser, document editing application, etc.) that displays an un-executable version of a workflow project for online collaboration. The client devices 110 may be configured to operate in an open domain or a closed domain. For example, the client devices 110b and 110c may be part of a closed domain 116 that may also include the processing server 102. A closed domain may comprise an enterprise local area network ("LAN"), which is separated from the public Internet via one or more gateways, firewalls, etc.

While FIG. 1 shows three client devices 110, it should be appreciated that an online design collaboration session may include any number of client devices 110 in an open or closed domain. Further, while FIG. 1 shows a single collaborative session, it should be appreciated that the intermediary processing engine 106 and/or the processing server 102 may concurrently host tens to hundreds of collaboration sessions. In some embodiments, a client device 110 may be part of more than one session at a time. For example, a user may open multiple web browsers, with each web browser displaying a separate workflow project.

A. Online Collaboration Implementation Embodiment

Figure 2A:
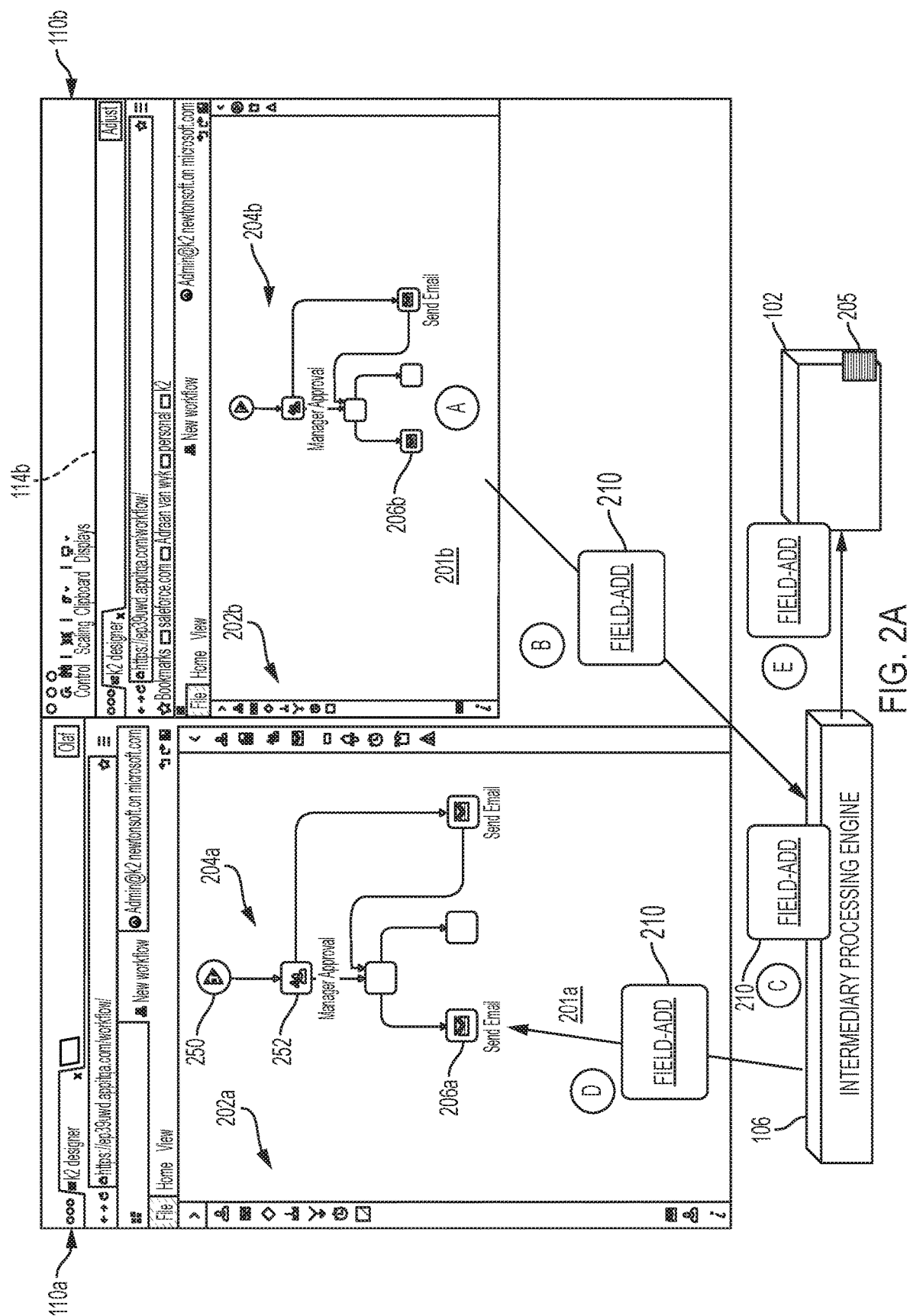
FIG. 2A shows a diagram that is illustrative of an online collaboration between client devices, according to an example embodiment of the present disclosure.

FIG. 2A shows an example of an online collaboration between the client device 110a and the client device 110b. In this example, during an online collaboration session, the client device 110a is displaying a web browser application 114a and the client device 110b is displaying another web browser application 114b. The web browsers 114 display a workflow editing workspace 201 (shown as respective workspaces 201a and 201b) that may be defined by one or more toolset files (shown as toolset 202a and 202b). The toolset files provide or define features that enable users to edit workflow projects 204a and 204b within the respective third-party web browser applications 114a and 114b. The workflow projects 204*a* and 204*b* are un-executable versions of an executable workflow project 205 located at the processing server 102.

In some embodiments, the example toolset file 202 defines or includes rules that specify different types of workflow project data services for the design canvas 201 (e.g., a workspace for object-orientated programming). The data services define calls that, when implemented in an executable version of a workflow project, request access to backend data or operations. Data services also define operations that a user can perform within the design canvas 201 to create and/or edit a workflow project. Data services can include, for example:

Data Services including saving, loading, and a caching of data from one or more data sources;

Popup Services that are responsible for controlling pop-ups (including modals and non-modals);

Environment Services that contain defaults needed for a design environment (e.g., query string parameters), determine where a design environment is hosted (e.g., SmartForms or SharePoint), and determine what design environment to display (e.g., Workflow designer or SmartObject designer, etc.);

Context Provider Services that store context providers across a design environment, and are used to access that providers;

Object Model Services that handles the saving and the loading of the design environment items and objects to and from a database;

Process Services that handle process specific actions such as creating new activities or events;

Canvas Services that are used to access canvas specific items such as activities rendered in GoJS;

Clipboard Services that are responsible for controlling clipboard functions;

Collaboration Services that are responsible for controlling SignalR instructions and collaboration;

Command Services that are used to notify other services when a certain keyboard command is triggered;

Configuration Panel Services that handle the open and close of a config panel, as well as provide a definition for each tab;

Context Browser Services that provide a context browser with fields that can be used;

Context Menu Services that are responsible for controlling right click context menus;

Drag Drop Services that are responsible for controlling drag drop events;

Filter Panel Services that handle a third panel showing when a filter control is set into complex mode;

Help Services that use a json config file to return a help url based on a token specified;

Item Provider Services including a Context Brower, which is linked to item providers for identifying what needs to load in the context browser at what stage (e.g., each tab in the context browser has it's own item provider);

Notification Services that are responsible for handling notifications to the user, client-side logging, suppression of specific messages and popping toasts for the user;

Plugin Services that register user interface components as plugins and handle which item providers needs to load for the plugin, and handle collapse and expansion of the user interface components;

Recents Services that are responsible for handling areas needed to display recently used artifacts. It handles the context and the number of items associated with the context (e.g., recent search for users);

Recipients Panel Services that are responsible for setting a context of a rich panel service;

SmartField Composer Services that handle a display of the SmartField Composer for a specified SmartField;

SmartField Plugin Service that work with a SmartField Composer Service to load the correct content for the composer;

SmartWizard Services that are used by the Smart Wizards that handle events raised by different Smart Wizard controls;

Toolbox Services that provide functionality for the hosting of plugins within the toolbox user interface component;

Undo Redo Services that are responsible for tracking changes to registered object models and ensure changes can be reverted or reapplied;

Validation Services that perform validation within a specified context. This is used to implement a badging functionality and general workflow validation; and Workflow Settings Services that are used to determine if certain settings are configured for smart actions.

In some examples, the intermediary processing engine 106 may transmit the toolset files when a user of the device 110 requests to view/edit a certain workflow project. The toolset files operate as a plug-in extension to the web browser. In an embodiment, a user may receive a text message or email containing a hyperlink to an Internet Protocol ("IP") address, web address, or other address at which a workflow project is being hosted. The address may be located at the intermediary processing engine 106, the processing server 102, or a third-party server. A user causes the client device 110 to navigate to the workflow project upon selection of the hyperlink. A process at the destination of the hyperlink may read plug-ins installed on the browser of the client device 110. If the toolset is not already installed, the process transmits a toolset file to the client device to install the toolset 202. If the toolset is already installed, the process may activate or otherwise cause the toolset to be displayed in the application 114.

In other embodiments, the toolsets 202 may included or otherwise defined within a webpage at the destination of a hyperlink to a workflow project. The webpage includes code or plugins that define features for editing a workflow project. A web site may be hosted by the intermediary processing engine 106, the processing server 102, and/or a third-party server.

In the illustrated embodiment of FIG. 2A, a user of client device 110*a* may first create workflow project 204*a*, which is displayed within the workspace design canvas 201*a* as an un-executable version. The workflow project 204*a* defines an automated process for obtaining approval of a business request. The project 204 includes a number of different objects including a start object 250, which defines a starting point for the workflow. The project 204 also includes an approval object 252, which is logically linked to the start object 250. The approval object 252 defines actions or a form for receiving approval from one or more designated individuals. Downstream from the approval object 252 is an email object 206, which is configured to automatically transmit an email upon approval being received through object 252. In this embodiment, the user has specific domain knowledge and is able to create objects 250, 252, and 206. However, the user does not know how to define or specify fields for the email object 206.

While the session is ongoing, the user of client device 110a transmits a request message (e.g., a text or email) to the user of client device 110b. The request message includes, for example, a link to the workflow project 204. The user operates the application 114b on the client device 110b to navigate or otherwise open the same workflow project during the online collaboration session, which is shown as workflow project 204b in workspace 201b. The workflow project 204b shows the same canvas with the same lines and shapes (e.g., the same workflow project 204b) as the workflow project displayed by the client device 110a.

The user of client device 110b creates the requested fields for the object 206b, which is added to the workflow project 204b. A message containing an indication of the addition of the fields for the object 206b (e.g., an instruction) is transmitted to the intermediary processing engine 106, which transmits the indication message to the client device 110a. Upon receiving the indication, the application 114a of the client device 110a updates the workflow project 204a to include the newly created fields for the email object 206. At about the same time, the indication of the addition of the newly added fields of the object 206b is converted into executable instructions and sent to the processing server 102 to update the executable version of the workflow project 205.

The following describes in more detail process operations for propagating the addition of the fields of the object 206b at the workspace 201b to (i) the un-executable version of the project workflow 204a at the workspace 201a of client device 110a and (ii) the executable version of the workflow project 205 at the processing server 102.

Figure 3:
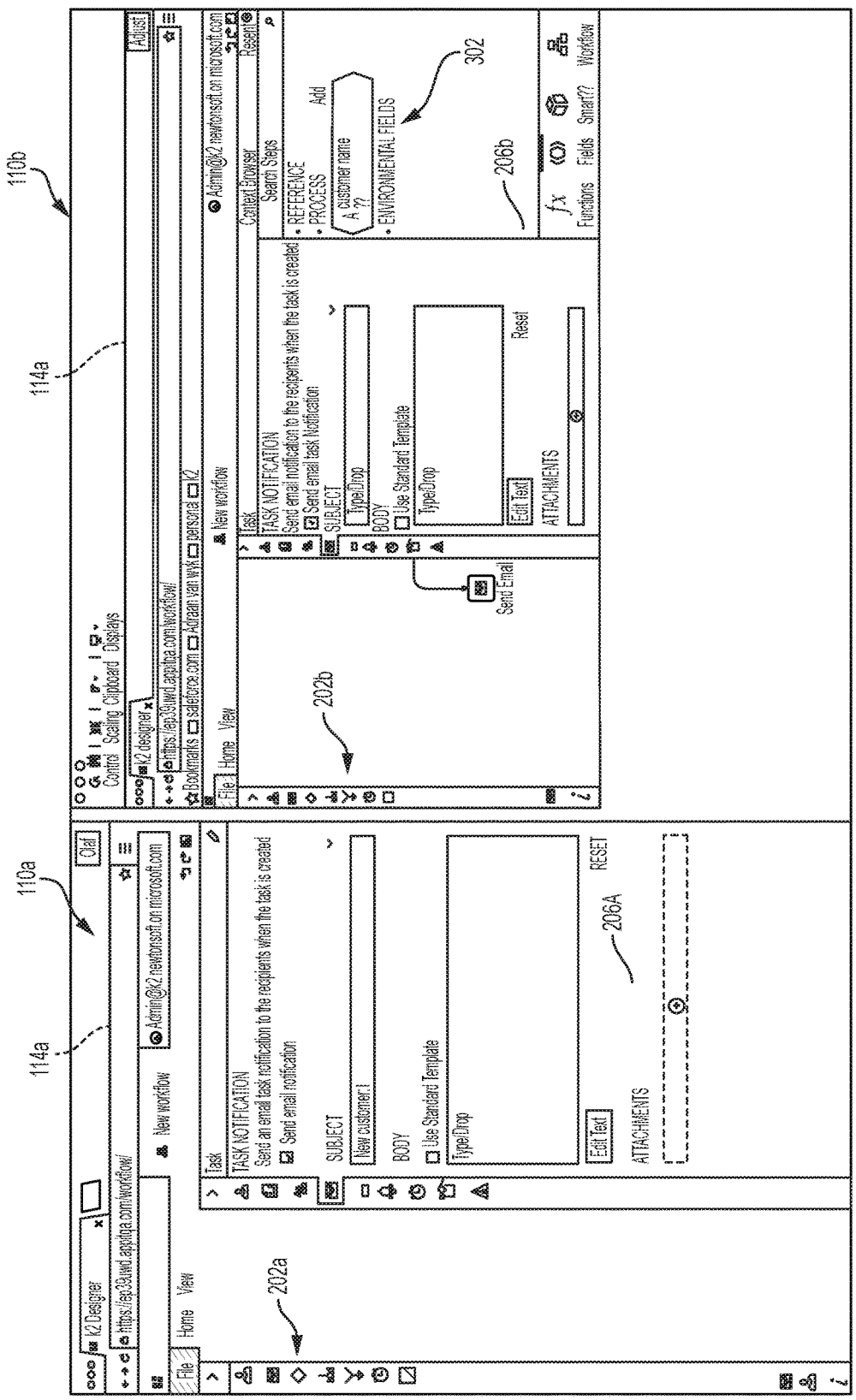
FIG. 3 shows an example of a second user at a client device modifying a property or attribute of an email object of a workflow project, according to an example embodiment of the present disclosure.

FIG. 3 shows an example of the second user at client device 110b creating one or more fields (in section 302) by modifying a property or attribute of the object 206b of the workflow project 204b. In the illustrated example, the user of client device 110a does not known which fields needed to construct the email object 206. However, the user of the client device 110b (e.g., a domain expert) understands what fields are needed for the email object 206. To create the fields for the object 206b, the user at the client device 110b defines a new data field at section 302 within the object 206b (e.g., edits a property or attribute) with the understanding of how that field will be populated and consumed. The intermediary processing engine 106 receives, from the client device 110b, an instruction indicative of the change to the object 206, and propagates the instruction to the client device 110a so that the user can use the newly added data field of the object 206a.

FIG. 2A shows how the change to the object 206 is propagated from the client device 110b to the client device 110a. When the user at the client device 110b modifies the object 206b, a property of the object 206b is modified to reflect the newly added field. The object 206b may contain, for example, a list of available fields that may be selected by a user. In other examples, values for the fields or properties may be added or a link to data for population into the fields or properties may be added. At the moment (reflected by Event A, illustrated in FIG. 2A as a circled "A") the object 206b is modified, the object 206a at client device 110a is still reflective of the unmodified object. Shortly thereafter, at Event B, an instruction 210 is generated and sent from the client device 110b to the intermediary processing engine 106. The instruction 210 specifies the field that was added and identifies the object 206. In other embodiments where additional modifications to the workflow project 204 are made, the instruction 210 specifies these other modifications. Alternatively, an instruction may be generated for each modification or an instruction may be generated for all changes made to an object.

At Event C in FIG. 2, the instruction 210 is received and queued at the intermediary processing engine 106. The intermediary processing engine 106 determines that the client device 110a is part of the same collaborative session as the client device 110b. Accordingly, at Event D, the intermediary processing engine 106 transmits the instruction 210 to the client device 110a (and any other client devices that are part of the same session). In some instances, the instruction 210 may be transmitted as a JavaScript Object Notation ("JSON") payload. The workspace 201a applies the instruction 210 to the object 206a (the un-executable version) such that the object 206a now mirrors the object 206b. The time between Events A and D may be a few milliseconds to seconds such that the change appears almost instantaneous.

At Event E, which is generally after Event D, the example intermediary processing engine 106 transmits the instruction 210 to the processing server 102. The example processing server 102 applies the instruction 210 to the executable version of the object 206. In some instances, the processing server 102 may not apply the instruction 210 until a save or commit command is received from either of the client devices 110. Additionally or alternatively, the processing server 102 may apply the instruction 210 to an executable version of the object 206 within a temporary version of the executable version of the workflow project 205. The processing server 102 may only update a permanent version of the workflow project 205 when a store or commit message is received from either of the client devices 110 that are in the collaborative design session. In these instances, the temporary version of the workflow project 205 enables on-demand execution or simulation without the change necessarily being saved.

Prior to Event E, in some embodiments, the intermediary processing engine 106 may convert the instruction 210 into a format for updating a version of the object 206 associated with the workflow project 205. The intermediary processing engine 106 may convert the instruction 210 by changing labels and/or data from typescript specifications or properties into C # classes, functions, or code that modifies corresponding executable code associated with the object at the workflow project 205. In some embodiments, the processing server 102, instead of the intermediary processing engine 106, converts the instruction 210 after Event E.

As shown in the above-example, the intermediary processing engine 106 of FIG. 2A propagates changes to the workflow project 204 among the users while keeping separate the executable version of the workflow project 205. This enables a rendering or visualization of a declarative model (an un-executable version of the workflow project 204) to be modified at the user-level in a third-party application, such as a web browser, while separately updating the executable version of the workflow project 205 or declarative model, thereby enabling the client devices 110 to modify the model without having capability of locally executing the model.

B. Intermediary Processing Engine and Processing Server Embodiment

Figure 2B:
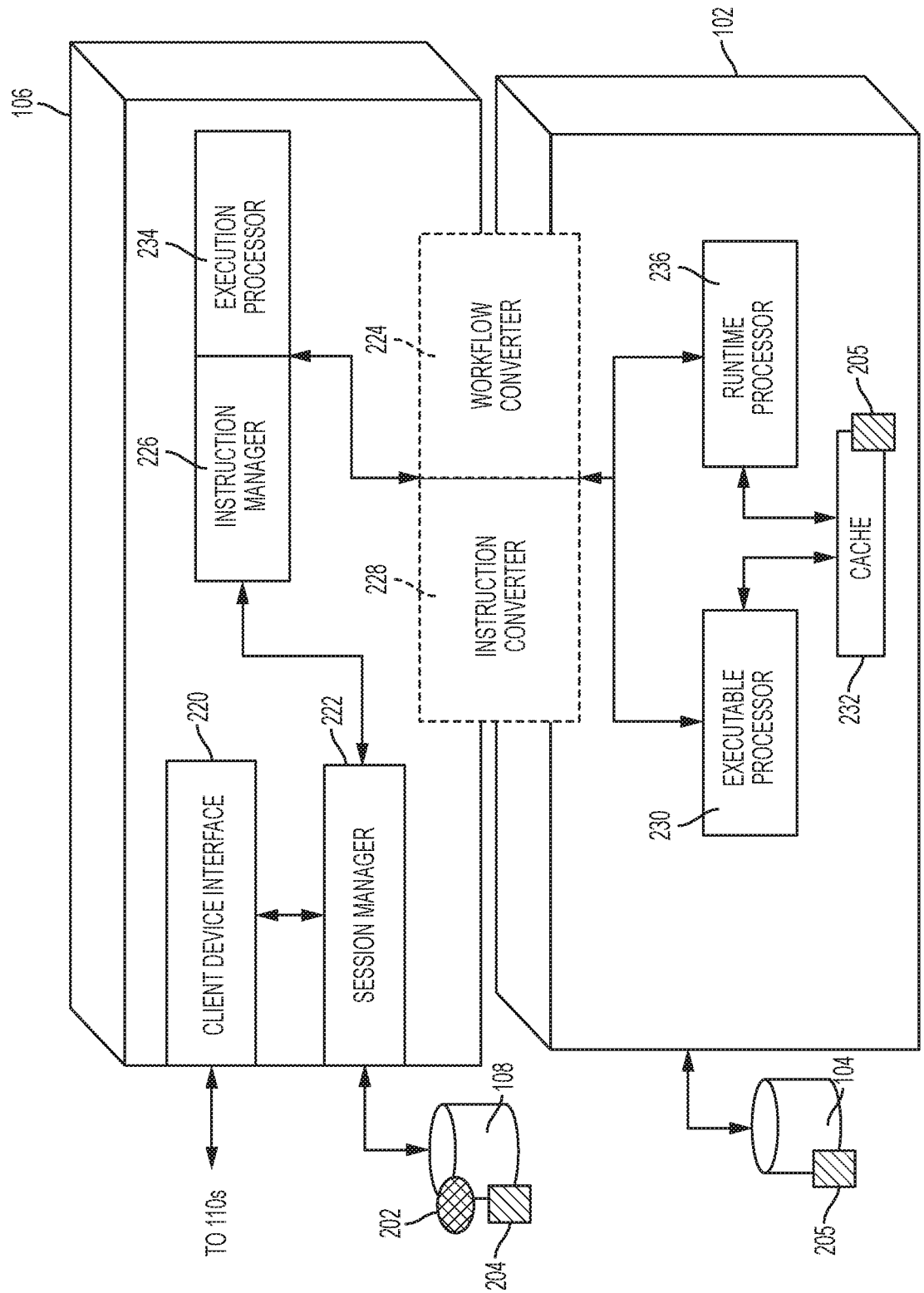
FIG. 2B shows a diagram of an intermediary processing engine of the online collaboration environment shown in FIGS. 1 and 2A, according to an example embodiment of the present disclosure.

FIG. 2B shows a diagram of the intermediary processing engine 106 and processing server 102 of FIGS. 1 and 2A, according to an example embodiment of the present disclosure. It should be appreciated that the operational blocks shown in FIG. 2B are representative of computer-readable instructions or interface specifications stored in a memory related to the intermediary processing engine 106 and/or the processing server 102, that when executed, cause either or both of the intermediary processing engine 106 and/or the processing server 102 to perform certain actions, routines, algorithms, operations, etc. Accordingly, the operational blocks shown in FIG. 2B may be logically combined, further partitioned, rearranged, etc. without deviating from the disclosure herein.

The intermediary processing engine 106 includes a client device interface 220 configured to communicate with the client devices 110 of FIGS. 1 and 2A. The interface 220 may include an address, an address-prefix, a domain name, etc. corresponding to a virtual location of the intermediary processing engine 106 with respect to the network 112. The example interface 220 is configured to receive information from the client devices 110, including, for example, request messages to view or open a workflow project, request messages to provide a workflow project for collaboration, request messages to execute a workflow project, and/or instructions indicative of changes or modifications made to one or more workflow projects. The example interface 220 is also configured to transmit information from the intermediary processing engine 106 to the client devices 110. The transmitted information includes, for example, an un-executable version of a workflow project, execution results from a workflow project, and instructions or instruction sets indicative of changes made to a workflow project.

The example client device interface 220 operates in connection with a session manager 222 to determine which client devices 110 are associated with which collaborative sessions. Each session corresponds to a different workflow project, of which an executable version may be stored in the memory 108. The example session manager 222 maintains separate session lists that each includes an identifier, link, or address to an un-executable workflow project stored in the memory 108 and addresses, usernames, and/or identifiers of client devices 110 that are viewing or otherwise modifying the respective un-executable workflow project. The example client device interface 220 may also be configured to provide authentication to enable only certain user of client devices 110 to access certain workflow projects.

To create a session, the example session manager 222 receives a request message from one of the client devices 110 identifying a workflow project (or indicating that a new workflow project is to be created). In some embodiments, the request message may include a hyperlink, address, and/or identifier of the workflow project. In other embodiments, the request message may initiate a file browsing interface with the session manager 222 to enable a user to select a workflow project stored within a directory or other file structure. The intermediary processing engine 106 may store un-executable versions of workflow projects within the memory 108 for selection. Each of the un-executable versions of the workflow project may include an identifier, link, and/or address, which is used by the client devices 110 and/or the intermediary processing engine 106 for identification and access. For example, users of client devices 110 may share a link or address to a workflow project (or instruct the intermediary processing engine 106 to transmit an address or link to a workflow project) to permit other users to access the workflow project during a session.

In other examples, only an executable version of a workflow project is available for selection. In these other examples, the session manager 222 provides a file browser to executable workflow projects stored, for example, in the memory 104 of the processing server 102. After selection by a user, a workflow converter 224 of the processing server 102 and/or the intermediary processing engine 106 creates or generates an un-executable version of the selected workflow project. After conversion, the session manager 222 stores the un-executable version of the workflow project to the memory 108 and separately transmits a copy of the un-executable version of the workflow project to the requesting client device 110.

After an un-executable version of a workflow project is selected, in some embodiments, the session manager 222 is configured to store an identifier of the workflow project to a session list. The session manager 222 also stores an identifier and/or address of the requesting client device 110 to the session list. The session manager 222 uses the client device interface 220 to transmit a copy of the un-executable version of the workflow project (e.g., the workflow project 204 of FIG. 2A). Transmission includes, for example, transmitting one or more internet protocol ("IP") packets that include typescript code for rendering a graphical display of the workflow project. As shown in FIGS. 2A and 3, the graphical display includes icons or pictures representative of objects, lines or similar graphics indicative of connections between objects, and fields/tables prompting user selection and/or entry of values. As such, the typescript code may specify field options for each parameter and/or attribute of an object.

In some embodiments, the session manager 222 transmits the copy of the un-executable version of the workflow project for display within a web browser application, a form, or other third-party application reader/viewer (e.g., the application 114 of FIGS. 1 and 2A). In other examples, the session manager 222 may record an image of the workflow project, which is transmitted to the client devices 110. In either embodiment, the example session manager 222 is configured to transmit one or more toolset files 202 to the client device 110 (if needed) to enable editing of the workflow projects. The toolset files 202 may be stored in the memory 108 or a separate memory and provide features or operations that are generally not native to the web browsing or other third-party viewing application (e.g., the application 114). Instead, the toolset files 202 define actions or operations a user may perform to add/remove objects, create linkages or nests among objects, and/or create/define fields/properties/attributes of objects. In some embodiments, the toolset files 202 are unique per project type or the workflow project itself.

The toolset files 202 may include plug-ins for an application operating on the client device 110 that is rendering the un-executable version of the workflow project. In other instances, the toolset files 202 may include separate applications that operate in connection with a viewer application. The session manager 222 is configured to transmit the toolset files 202 in connection with the selected workflow project. In examples where a client device 110 may retain a toolset file 202, the session manager 222 may first check whether a toolset file 202 is installed at the client device 110 before determining if a toolset file 202 is to be transmitted with the workflow project.

After a session is created, the example session manager 222 is configured to operate in connection with an instruction manager 226 to process the instructions (e.g., modify instructions or messages). As discussed above, client devices 110, during a session, enable users to modify the un-executable version of a workflow project. Each modification (or group of modifications) is documented and stored as an instruction at the application (e.g., the application 114) at the client device 110. The toolset file 202 may include code that specifies how user-provided edits are stored to one or more instructions, including the format of the instructions. The client device interface 220 is configured to receive the instructions periodically (e.g., every 1 second, 5 seconds, 10 seconds, 30 seconds, etc.), after a user saves the changes, or as the changes are made. The instructions may include an identifier which identifies the workflow project. The session manager 222 uses either a source address identifier of the client device 110 included with the IP packets for transmission of the instructions or the identifier within the instructions to determine a corresponding session.

The session manager 222 stores the instructions to an instruction set for subsequent transmission to other client devices 110 that are part of the collaborative session. In some examples, the session manager 222 creates an instruction set for each client device 110 that is part of a session, where instructions received from a first client device 110 are added to instruction sets for other client devices of the same session. This configuration prevents a client device 110 from receiving instructions it has previously transmitted. In other examples, all instructions received from all client devices 110 of the same session are stored to a single instruction set, which is then transmitted periodically (e.g., every 0.5 seconds, 1 second, 5 seconds, 10 seconds, 30 seconds, etc.) to all of the client devices 110 that are part of the session. In yet other examples, the instructions are broadcast to the client devices 110 after receipt by the client device interface 220. The toolset files 202 at the client devices 110 include rules that are operated to apply the instructions to the workflow project, where instructions that describe changes already made locally become moot.

The example session manager 222 stores instructions received during a session to the memory 108 (e.g., an Azure database, a SQL database, an in-memory database, etc.). This enables the instructions to be stored in conjunction with the un-executable version of the workflow project. Thus, when a new user joins a session, the session manager 222 transmits the un-executable version of the workflow project in addition to the instructions, which define how the project has changed during the session. This enables the new user to view all changes during a session and ensures that every client device has the latest 'version' of the workflow project available for display.

The instructions are transmitted from the client device interface 220 in batches as a JSON array. The instruction manager 226 may shred the instructions into the database temporary storage 108 as independent instructions. The instructions are then transmitted by the interface 220 to the client devices 110 via, for example, SignalR in batches, again as a JSON array. This JSON configuration enables the instructions to be played one-by-one on every client device 110 regardless of a size of the batch on either side of the runtime execution. For example, there may be four messages batched from the 'source' client device and sent to the interface 220 for temporary storage and processing. The session manager 220 already has three instructions in storage when the batch comes in, bringing the total to seven instructions for processing. Other client devices 110 may have missed all seven instructions, and in the next batch the devices receive all seven instructions from the interface 220. This configuration allows for flexibility of latency and network issues to be handled by the accordion style processing of the instructions, thereby guaranteeing that every instruction will be eventually 'played' on every client device 110.

In some embodiments, an algorithm operating on the session manager 220 and/or the instruction manager 226 enables the collapsing of multiple related instructions into a single 'final' instruction. For example, if an object is being moved on a design canvas 201 on the 'source' client device 110, then each coordinate change will become part of the instruction set that will be played on every client device. Although this has the effect of each client device seeing exactly what the source user did, it can lead to a 'jittery' experience. The client devices 110 do not technically need to play every coordinate move. Instead, the client devices 110 just need to know the starting and ending coordinates to show the completed move of the object. The algorithm is configured to enable for this 'final' answer approach to the instruction set, which may reduce any jitter or perceived lag that may result from displaying intermediate movements. This would be similar to the concept of closing the client session for a period of time and then opening it back up. In this case, the instructions are not played but instead the last known 'state' of the canvas is simply opened on the client device and then it starts participating in the instructions from there on.

In some examples, the client device interface 220, the session manager 222, and/or the instruction manager 226 are configured with SignalR to listen for messages/instructions from the client devices 110 and persist them to the memory 108 and/or the session manager 222. SignalR is also configured to transmit those same messages/instructions for the client devices 110 that are part of the collaborative session. The instruction messages are transmitted using, for example, a JSON payload. The session manager 222 transmits the instructions by hydrating the temporarily persisted JSON instructions into a typescript un-executable version of a workflow project. Interfaces of the toolset 202 at the client device may include interfaces that apply the changes specified in the instructions to the workflow project. The SignalR configuration enables client devices 110 to 'replay' the same instruction set, which updates the user interface of the application 114 via an AngularJS two-way binding approach.

SignalR includes a library for ASP.NET, which enables the addition of real-time web functionality to applications (e.g, the applications 114). Real-time web functionality provides the ability to have server-side code push content (e.g., the instructions) to the connected client devices 110 as the instructions are received at the interface 220 and/or manager 226. SignalR, in some embodiments, is operated by the manager 226 to send instructions to a SignalR hub (such as the interface 220 or a downstream router), which SignalR will process using a code linked to the hub. The hub can then determine how to route the instructions. The hub may take the instructions and save it or broadcast it to the other connected client devices 110. The hub handles clustered internet information services ("IIS") instances (e.g., websites). This enables, for example, instructions to be broadcasted to all connected client devices simultaneously.

As provided above, an instruction (e.g., the instruction 210) records changes to an object, a workflow project, or changes to workflow projects more generally. An object defines one or more actions or methods that are performed. The object may include one or more properties that define aspects of the object. For example, a property or attribute may define or specify who may access an object, how an object is to be displayed, an input location from a data source or another object, an output location to a data source or another object, and/or a data type. Properties may also define available fields for an object. For instance, an unmodified object may be configured to have 20 different fields available. A user may select one or more of the fields (as shown in section 302 of FIG. 3) for use with the object, thereby activating the field for use. Values or references may be populated into the fields to designate how data is to be processed. The instructions accordingly specify how an object or action is to be configured.

Other modifications to objects of an un-executable version of a workflow project that results in the generation of an instruction include (a) drawing an object or step at x/y coordinates within design canvas 201, (b) configuring or linking inputs/outputs to an object by drawing a line (including coordinate values), (c) configuring objects field details (e.g., To addresses, From addresses, and Body Text for the email object 206), (d) drawing drop-down form controls at x/y coordinates, (e) configuring drop-down control details for a form or object data source/data value/data display bindings, (f) an identifier property for a smart-object, and (g) a configuration of an identifier property as an auto-number including a primary key.

The example instructions define changes at an abstraction layer to enable processing of the same instruction by the instruction manager 226 (or at the client devices 110) for the un-executable version and by the instruction converter 228 and/or processing server 102 for the executable version. At the abstraction layer, objects and other items of a workflow project are represented generically via a set of interfaces that include common framework attributes and methods. The interfaces enable further translation to different programming languages, thereby allowing for simultaneous processing of the same instruction for different purposes.

In some embodiments, the instruction manager 226 is configured to apply changes specified in the instructions to the un-executable version of the workflow project just as the client devices 110 also apply the instructions to local copies of the workflow project. To apply changes specified in instructions, the instruction manager 226 and/or the client device 110 edits the workflow project using, for example, JSON and QuickPath information specified within the instructions. In other words, instructions specify changes made to a typescript workflow project in JSON and QuickPath. The instructions at the destination client devices 110 and instruction manager 226 provide a typescript specification at an abstraction layer defining how certain objects, properties, attributes, fields, etc. are to be edited. For example, an instruction that specifies a creation of an object in JSON and QuickPath causes the instruction manager 226 to create the object within the un-executable version of the workflow project. In another example, an instruction that specifies a newly created field in an object and corresponding property values causes the instruction manager 226 to activate the specified field in the object and store the property values.

Additionally or alternatively, the instructions are used to update the executable version of the workflow project stored in the memory 104 of the processing server 102. However, the instructions need to be converted because they are specified in, for example, a JSON and QuickPath format as an abstraction of the executable version of the workflow project. The instruction manager 226 transmits the instructions to, for example, an instruction converter 228, which converts the instructions into a format for modifying the executable version of the workflow project. The instruction converter 228 may be included with the intermediary processing engine 106 and/or the processing server 102.

The example converters 224 and 228 provide an abstraction of the instruction/processing layer with respect to the executable version of workflow projects stored in the memory 104. This level of abstraction corresponds to the abstraction layer at which the instructions are provided. The example converters 224 and 228 are configured to process objects, including smart-objects (e.g., nested objects), forms, workflow projects, etc. that have been described via a set of interfaces. In other words, the converters 224 and 228 define interfaces between executable code of a workflow project and the corresponding typescript un-executable version and corresponding instructions. The interfaces of the converters 224 and 228 define, for example, a structure for creating or modifying objects that is common among C # classes and typescript classes. The interfaces may include an intermediate model and/or Authoring Framework APIs (e.g., an abstraction interface). The instructions are layered on the object structure as a set of generic interfaces. For example, an arbitrary Object XYZ has properties A, B, C. The converters 224 and 228 are configured to provide interpretation of the properties for the processing server 102 via an instruction.

To convert instructions, the example instruction converter 228 includes different interfaces or a model comprising different interfaces. Each interface may correspond to a different instruction type, object type, property, attribute, etc. The instruction converter 228 pushes instructions down to the executable version of the workflow project. In an example, the instruction converter 228 hydrates temporarily persisted objects as the generated C # classes and maps the instructions to the Authoring Framework APIs (e.g., an intermediate model or abstraction interface). The instruction converter 228 uses a typescript client object model to generate an identical C # object model, which is used by an executable processor 230 at the processing server 102 to hydrate the executable version with the instructions.

Information within the instruction are used by the converter 228 to select the interface. Information within fields of the instruction are uses to populate fields of an interface, which enable certain C # code or classes to be generated or configured. For example, an instruction may specify the creation of an email object. The type of the instruction is used to select an interface for creating objects. The interface includes fields that correspond to JSON and/or QuickPath information in the instruction. Selection of the interface and population of the fields causes an executable processor 230 to locate a C # class for generating an object of the type specified by the interface. The fields of the interface are then used by the processor 230 to populate certain variables, inputs/outputs, properties, and/or attributes of the located C # class for the object.

In another example, an instruction may specify the creation of a property for a designated object. The instruction includes an identifier of the object. The instruction converter 228 selects an interface for property creation of an object of the type specified. The object identifier is used by the executable processor 230 to locate the corresponding object in the C # code. The specification of the property in the fields of the interface is used to locate and apply the appropriate C # class property to the object. Values provided with the property in the instruction are specified in one or more fields of the interface and used to define variables within the selected C # class property of the object.

In some examples, the instruction manager 226 operates in connection with the instruction converter 228 to apply all instructions as received to the executable version. In other examples, the instruction manager 226 operates in connection with the instruction converter 228 to apply instructions after a 'save' message is received from a client device 110. In yet other examples, the processing server 102 may create one or more temporary copies of the executable version of the workflow project, to which the instructions are applied. This enables un-saved versions of the executable workflow project to be operated. The executable processor 230 applies the instructions to the permanent copy after a 'save' message is received or the session is terminated.

As described above the instruction converter 228 provides a conversion of abstracted instructions to modify an executable version of a workflow project. In contrast, the workflow converter 224 includes interfaces for converting an executable workflow project into a typescript un-executable project. To convert an un-executable version of a workflow project from an executable version, the workflow converter 224 operates an interface between, for example, C # and TypeScript classes. The workflow converter 224 may include an Authoring API (e.g., application programming interface) for each of the building blocks of a workflow project including objects, smart-objects, forms, and workflows. The Authoring Framework API is a set of C # interfaces that build, persist, and retrieve a declarative representation of the object, artifact, or more generally, workflow project. The API also enables developers to build all the exact same artifacts directly via code. The workflow converter 224 operates the APIs to create un-executable versions of workflow projects that still specify how the workflow projects are to be displayed and specify properties/attributes of underlying objects, forms, etc.

In some examples, a logical model of a workflow project may be created and stored to the memory 104 and/or 108. The logical model may be un-executable. However, the logical model is not easily displayable in a web browser or other third-party applications. In these examples, the workflow converter 224 is configured to create a typescript version as an un-executable version displayable at the client devices 110 and an executable C # model stored at the processing server 102. The abstraction of the logical model may be linked via interfaces at the workflow converter 224 into corresponding typescript classes for the un-executable version and C # classes for the executable version.

In some examples, the instruction manager 226 may check for conflicting instructions, which comprise instructions from two different client devices 110 that describe a similar change to an object or the project more generally. The instruction manager 226 may search for conflicts by identifying an object identifier and/or field associated with the instructions. A match indicates that changes from two different users may include contradicting or overriding edits. If a conflict is detected, the instruction manager 226 may transmit a message to the respective client devices 110 prompting a selection of one instruction.

As shown in FIG. 2B, the processing server 102 includes a cache 232 to store executable versions of a workflow project (e.g., the workflow project 205) for modification and/or execution. The cache 232 may include any volatile or non-volatile memory that enables reading/writing of the executable version of the workflow project. During a session, the executable processor 230 applies or hydrates instructions to the executable version of the workflow project to reflect changes made by users. The changes may be made to a temporary or permanent version of the workflow project.

As described above, the executable version of a workflow project is available at the processing server 102 while the non-executable versions of the workflow project are provided at the client devices 110 and the intermediary processing engine 106. The applications 114 at the client devices 114 may include a feature that enables a user to execute a workflow project to visualize data flow or results of operating one or more objects specified within the project. However, the client devices 110, including the viewer application 114 cannot run the local version of the workflow project because it is specified in, for example, typescript. Instead, execution requests are transmitted from the client device 110 to the interface 120 in an execution request message. The execution request message is routed within the intermediary processing engine 106 to an execution processor 234. The example execution processor 234 receives the request message and transmits an execution call to a runtime processor 236 at the processing server 102. In some instances, the instruction converter 228 may convert the call into an instruction that causes the runtime processor 236 to execute a specified workflow project.

The example request message and/or the request call may include an identifier of the workflow project. The request message and/or request call may also identify an object or action if instead a user only specified to execute a portion of the workflow project. The example runtime processor 236 is configured to locate the requested workflow project within the cache 232 (or load the workflow project from the memory 104) for execution. In some embodiments, the runtime processor 236 sends an instruction to the executable processor 230 to apply any pending or outstanding instructions to the requested workflow project prior to execution. To execute a workflow project, the example runtime processor 236 compiles C # code of the project and steps through the generated object code. Results from the execution are stored and transmitted by the runtime processor 236 to the execution processor 234. The example execution processor 234 creates one or more messages for the client devices 110 within the collaborative session. The execution processor 234 may address the messages based on the session list hosted by the session manager 222. The message(s) include the results, which are displayed by the applications 114 in conjunction with the displayed un-executable version of the workflow project. In some embodiments, the execution processor 234 transmits the results only to the client device 110 that transmitted the execution request. The execution processor 234 and the runtime processor 236 accordingly provide the appearance to client device(s) 110 within a collaborative session that execution of a workflow project occurs locally when instead the processing is offloaded centrally at the processing server 102.

C. Online Collaboration Architecture Embodiment

Figure 2C:
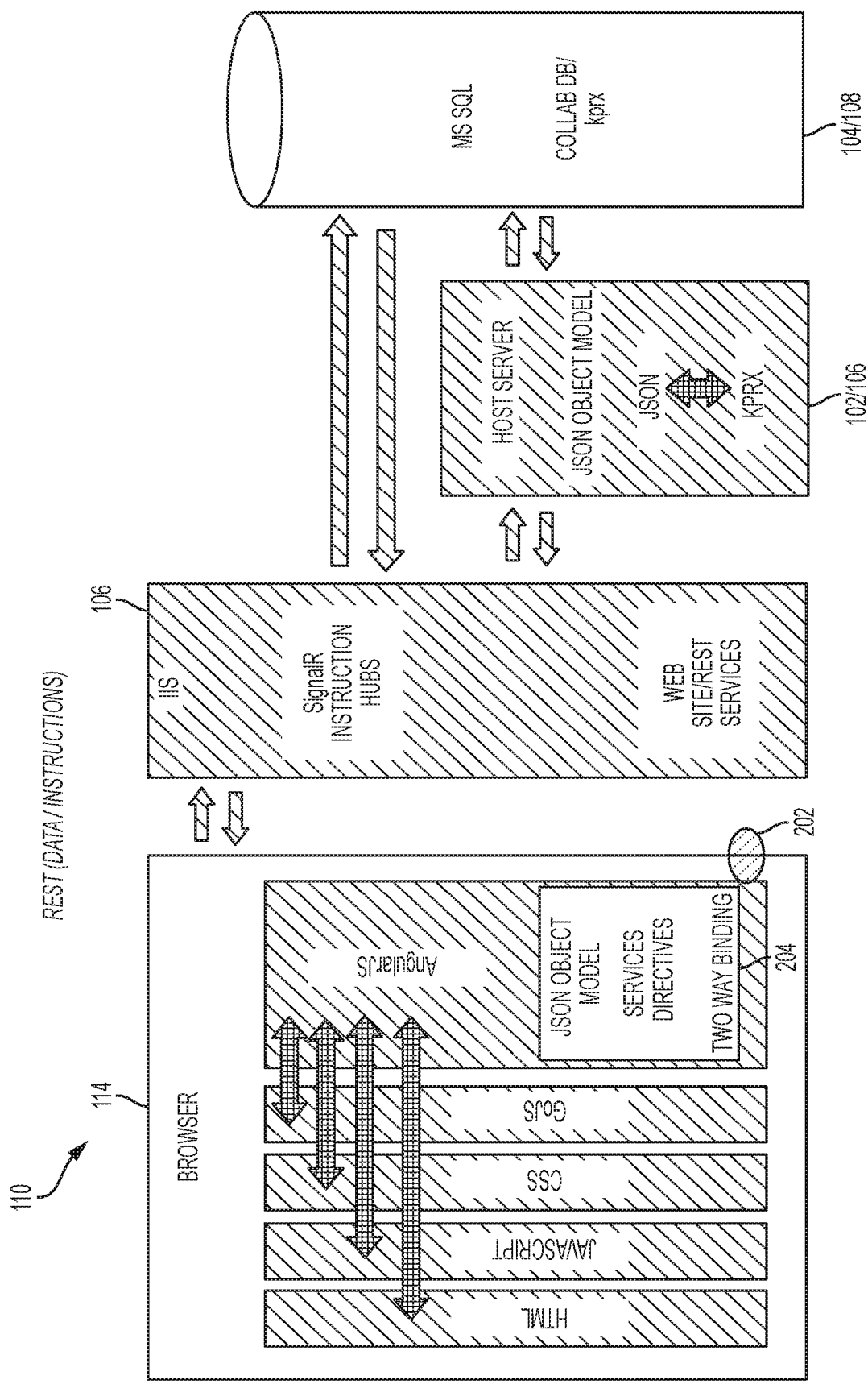
FIG. 2C shows an example architecture of the online collaboration environment of FIGS. 1, 2A, and 2B, according to an example embodiment of the present disclosure.

FIG. 2C shows an example architecture of the online collaboration environment 100 of FIGS. 1, 2A, and 2B, according to an example embodiment of the present disclosure. In this example, a client device 110 is operating a web browser application 114 to display an un-executable version of a workflow project 204. The un-executable version of the workflow project is defined as a typescript JSON object model and the executable version of the workflow project is defined as a 'kprx' file. The kprx file may be permanently stored in the memory 104 and loaded within a SQL table during editing by a user. In other examples, the executable version of the workflow project may be specified in XML.

In an embodiment, a user requests to create a new workflow project via the application 114. An instruction hub (e.g., the interface 220 and/or the instruction manager 226 of FIG. 2B) at the intermediary processing engine 106 (powered by signalR) transmits a call to a collaboration database, which may include memory 104 and/or memory 108. In addition, the application 114 creates a blank workflow project.

In another embodiment, a user may request to edit an already created workflow project which is stored at the collaboration database. The request from the user is received in the intermediary processing engine 106 and transmitted to the processing server 102 (e.g., a host server). In this embodiment, the request causes the workflow converter 224 to convert the kprx file of the full declarative executable workflow project to JSON using APIs, an intermediate model, and/or an abstraction interface that specify how code is converted into an object model. The object model corresponds to the un-executable version of the workflow project, which is transmitted from the intermediary processing engine 106 to the application 114 of the client device 110.

At the client device 110, the browser application 114 uses, for example, AngularJS, goJS, CSS, Javascript, and HTML to display the JSON object model and provide functionality for a corresponding toolset file 202. Regarding the JSON object model of FIG. 2C, services are reusable business logic independent of views. Directives are used to build up the HTML the user sees in the web browser. The directives are used to manipulate the output of Document Object Model ("DOM") elements based on user interaction. A sample of a directive is a tooltip. This adds an entire piece of HTML to render more extensive tooltips than what can be done with the title tag, by using a single attribute added to the element. The directives provide a user control over the user interface and allow for the user interface that is created to be reusable between pages (e.g., .aspx pages), by adding the directive element or attribute. Another sample of directives is for controls, so that they can be reused everywhere in the design environment.

Each change that is made to the workflow project via the application 114 is posted through to SignalR as instructions, stored in a SQL table within memory 108 at the intermediary processing engine 106. If the browser is closed, a certain amount of time goes by, or the workflow project is deployed, a flush command is sent to SignalR. All the instructions for that session are reassembled into process JSON. This is then sent to the deployment code to update the actual kprx executable project workflow. If instead a save command is received from the user, the krpx and/or the process JSON is saved to the SQL table so it can be loaded later. If a deploy command is selected, the kprx file is deployed to the processing server 102. Once this succeeds and a workflow project is deployed, the instruction hub is flushed of all instructions for that workflow project.

SignalR communicates directly with SQL where all other calls go through the processing server 102. An identical object model on the user interface of the application 114 is provided JSON typescript exists in addition to the backend in C #. The workflow converter 224 is configured to generate the backend code from the typescript object model, to keep it in sync. When loading a workflow project, the kprx file is retrieved from the SQL table and repopulates the object model, serializes the object model to JSON and then passes that to the application 114 for display. If the JSON is generated on the user interface application 114 as instructions, the server side object model is hydrated directly with the same JSON.

The intermediary processing engine 106 and/or the user interface on the client device 110 may use caching to limit calls. This may be implemented using Azure and is handled by a Data Service. A REST call may be made to the intermediary processing engine 106 to retrieve context browser data where long term caching (cross sessions) is enabled for that service. The next time a REST call is made with the same signature, the data may be used from the cache instead of the call actually going out to the intermediary processing engine 106.

II. Instruction Embodiments

The following section provides examples regarding how instructions are structured and managed by the toolset files 202, the intermediary processing engine 106, and/or the processing server 202 of FIGS. 1, 2A, 2B, and 2C. The code below highlights different instruction types that may be generated at the client device 110 based on actions being performed by a user on a workflow project. The value corresponding to the instruction types may be set in a header of an instruction. The instruction types include instructions for setting a simple property of an object or form, setting a complex property of an object or form, adding an object, removing an object, sending a message (such as to create or join a collaborative session), lock an object from editing by other users, and unlock an object for editing by other users.

```
public enum InstructionTypes
{
    SetSimpleProperty = 1,
    SetComplexProperty = 2,
    AddObjects = 3,
    RemoveObjects = 4,
    SendMessage = 5,
    LockObject = 6,
    UnlockLockObject = 7,
}
```

Figure 4A:
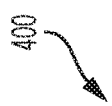
FIG. 4A shows a diagram of a structure of an instruction, according to an example embodiment of the present disclosure.

FIG. 4A shows a diagram of a structure of an instruction 400 (e.g., the instruction 210 of FIG. 2A), according to an example embodiment of the present disclosure. The instruction 400 includes fields for context, listing, JSON, an object reference (e.g., a QuickPath) to the object being modified, a property/attribute name, and a value. The object may include, for example, the email object 206 of FIG. 2A or the email object 604 of FIG. 6. The value of the instruction 400 corresponds to a value of the property/attribute. In addition, the JSON field provides an object value from a JSON tree. The instructions may have these objects modified before they are committed to a table. The instructions are programmed or otherwise configured to specify which objects are modified based on their qp/jsonpath column (e.g., a pointer). The QuickPath field is provided to update or inject properties at an exact point into the JSON (similar to XPath in XML) to cause to a specific node to update it. The QuickPath field identifies a code location needed to apply the instruction to process the JSON. Below are samples of a code for the QuickPath field:

sid001\8d9806f8-2c47-4487-b62e-65ac3d320fe9\root.nodes[{"internalId":2}].children[{"internalId":1}].configuration.formConfiguration.url sid001\8d9806f8-2c47-4487-b62e-65ac3d320fe9\root.nodes[{"internalId":3}].configuration.deadline.expressHours Further, below is an example full object JSON

```
{
  "nodes": [
    {
      "isStartActivity": true,
      "ui": {
        "y": 56,
        "topPorts": [
          {
            "portId": "topPorts_0",
            "internalId": 1,
            "componentId": 40012
          },
          {
            "portId": "topPorts_1",
            "internalId": 2,
            "componentId": 40012
          },
          {
            "portId": "topPorts_2",
            "internalId": 3,
            "componentId": 40012
          }
        ],
        "leftPorts": [
          {
            "portId": "leftPorts_0",
            "internalId": 1,
            "componentId": 40012
          },
          {
            "portId": "leftPorts_1",
            "internalId": 2,
            "componentId": 40012
          },
          {
            "portId": "leftPorts_2",
            "internalId": 3,
            "componentId": 40012
          }
        ],
        "bottomPorts": [
          {
            "portId": "bottomPorts_0",
            "internalId": 1,
            "componentId": 40012
          },
          {
            "portId": "bottomPorts_1",
            "internalId": 2,
            "componentId": 40012
          },
          {
            "portId": "bottomPorts_2",
            "internalId": 3,
            "componentId": 40012
          }
        ],
        "rightPorts": [
          {
            "portId": "rightPorts_0",
            "internalId": 1,
            "componentId": 40012
          },
          {
            "portId": "rightPorts_1",
            "internalId": 2,
            "componentId": 40012
          },
          {
            "portId": "rightPorts_2",
            "internalId": 3,
            "componentId": 40012
          }
        ],
```

```
            "template": "StartStep",
            "componentId": 40009
        },
        "systemName": "Start",
        "title": "Start",
        "internalId": 1,
        "componentId": 40000
    },
    {
        "ui": {
            "y": 168,
            "showLabel": true,
            "topPorts": [
                {
                    "portId": "topPorts__0",
                    "internalId": 1,
                    "componentId": 40012
                },
                {
                    "portId": "topPorts__1",
                    "internalId": 2,
                    "componentId": 40012
                },
                {
                    "portId": "topPorts__2",
                    "internalId": 3,
                    "componentId": 40012
                }
            ],
            "leftPorts": [
                {
                    "portId": "leftPorts__0",
                    "internalId": 1,
                    "componentId": 40012
                },
                {
                    "portId": "leftPorts__1",
                    "internalId": 2,
                    "componentId": 40012
                },
                {
                    "portId": "leftPorts__2",
                    "internalId": 3,
                    "componentId": 40012
                }
            ],
            "bottomPorts": [
                {
                    "portId": "bottomPorts__0",
                    "internalId": 1,
                    "componentId": 40012
                },
                {
                    "portId": "bottomPorts__1",
                    "internalId": 2,
                    "componentId": 40012
                },
                {
                    "portId": "bottomPorts__2",
                    "internalId": 3,
                    "componentId": 40012
                }
            ],
            "rightPorts": [
                {
                    "portId": "rightPorts__0",
                    "internalId": 1,
                    "componentId": 40012
                },
                {
                    "portId": "rightPorts__1",
                    "internalId": 2,
                    "componentId": 40012
                },
```

```
        {
          "portId": "rightPorts_2",
          "internalId": 3,
          "componentId": 40012
        }
      ],
      "template": "PlaceholderStep",
      "componentId": 40009
    },
    "configuration": {
      "deadline": {
        "actionType": 3,
        "specificDate": { "componentId": 10008 },
        "expressDays": { "componentId": 10008 },
        "expressHours": { "componentId": 10008 },
        "expressMinutes": { "componentId": 10008 },
        "expressSeconds": { "componentId": 10008 },
        "noDeadline": true,
        "withinWorkingHoursOnly": true,
        "componentId": 30025
      },
      "priority": 1,
      "decisionOptionType": 1,
      "componentId": 40001
    },
    "systemName": "PlaceholderStep",
    "internalId": 2,
    "componentId": 40000
  }
  ],
  "links": [
  {
    "fromInternalId": 1,
    "toInternalId": 2,
    "ui": {
      "fromPortId": "bottomPorts_1",
      "toPortId": "topPorts_1",
      "path": "0,84,0,104,0,112,0,112,0,120,0,140",
      "template": "DefaultLine"
    },
    "configuration": { "componentId": 40013 },
    "internalId": 1,
    "componentId": 50002
  }
  ],
  "configuration": {
    "processDefinitions": [
    {
      "internalId": 1,
      "componentId": 20000
    }
    ],
      "processPriority": 1,
      "exceptionSettings": {
      "logException": true,
      "componentId": 50012
    }
  }
},
"title": "Sa2",
"componentId": 50001
}
```

Figure 4B:
FIG. 4B shows a diagram representing a schema of a workflow project or object to which the instruction of FIG. 4A can be applied to modify the workflow project or object, according to an example embodiment of the present disclosure.

FIG. 4B shows a diagram representing a schema 450 of a workflow project or object to which the instruction 400 of FIG. 4A can be applied to modify the workflow project or object, according to an example embodiment of the present disclosure. The schema 450 is for a flattened JSON model. A toolset file at a client device 110 uses the schema 450 for applying instructions to the workflow project or object. The schema 450 accordingly enables instructions to modify discrete sections of the workflow project or object without affecting other sections.

The ID field of the schema 450 is a unique identifier that enables the session manager 222 to differentiate multiple instructions/portions of code for modification. The ID value may be based on a combination of a date/time value with a device identifier to ensure instructions are unique during a collaborative session. The SessionID field of FIG. 4B is configured to enable each collaborative session to be unique to make sure the correct instructions are applied to the appropriate session by the session manager 222. The JSON field provides an object value from a JSON tree. The instructions may have these objects modified before they are committed to a table. The instructions are programmed or otherwise configured to specify which objects are modified based on their qp/jsonpath column (e.g., a pointer). As discussed above, the QuickPath field is provided to update or inject properties at an exact point into the JSON for modification.

Figure 5:
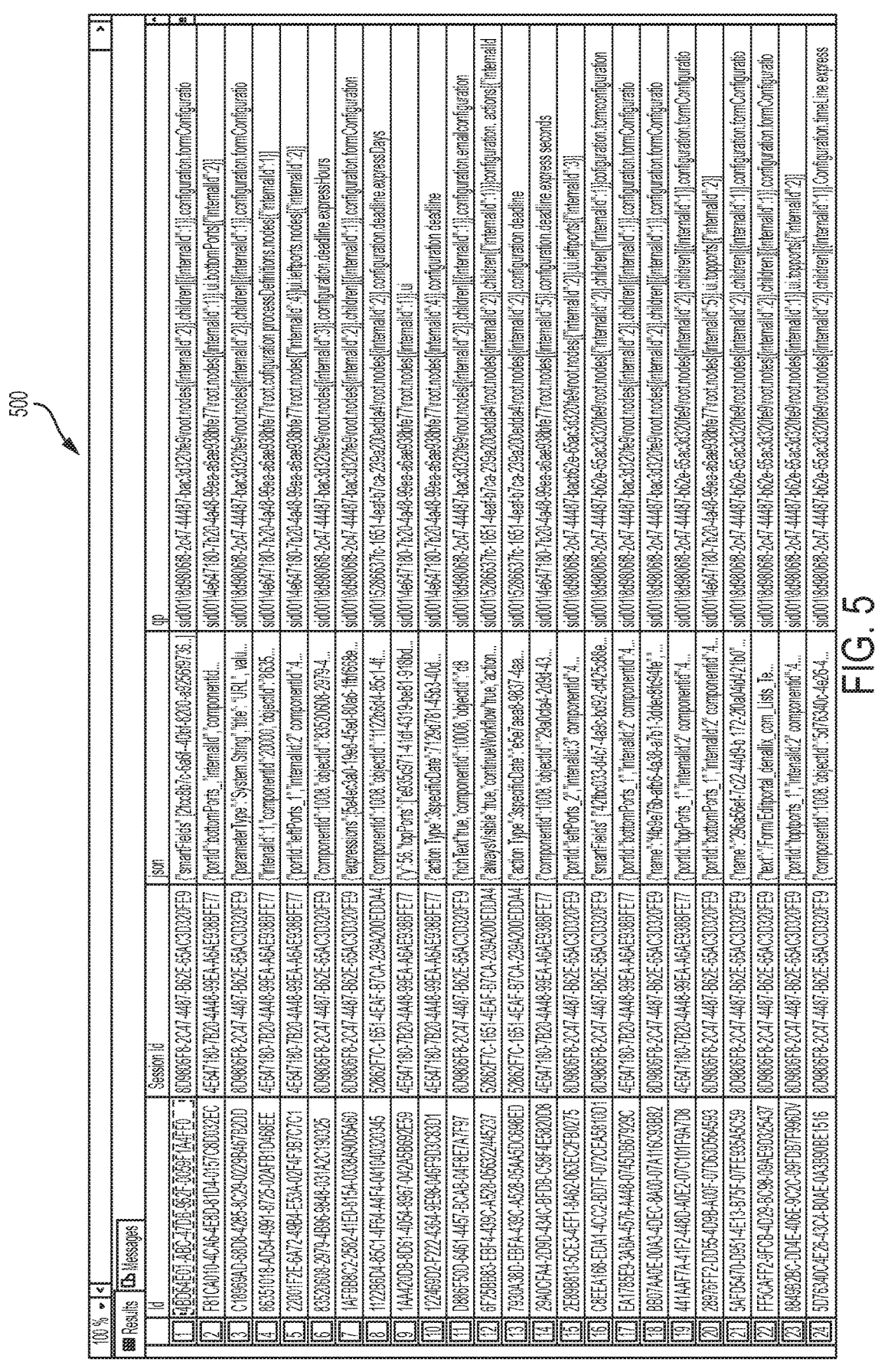

FIG. 5 shows a table 500 representative of a workflow project or object partitioned into granular sections for modification by respective instructions, according to an example embodiment of the present disclosure. Each row in the table 500 represents a node in an object model or workflow project to which an instruction is to be applied. In other words, each row includes a portion of JSON code that is to undergo modification to reflect changes to an object or workflow project at another location. The table 500 is maintained at the client devices 110 during an online session and at the intermediary processing engine 106 for updating local un-executable versions of workflow projects. When an instruction is received at a client device 110 and/or the intermediary processing engine 106, a QuickPath specified in the instruction is used to select the node or portion typescript code of the object or workflow project. The selected typescript code (e.g., JSON) is stored to the JSON field in the table 500. The instruction is then applied to the typescript code such that changes to the code are made. For example, an instruction that includes the addition of a property adds the property code to the code included in the JSON column. In another example, a change of a property or attribute value causes in an instruction causes the value within the specified portion of the object code to be likewise changed in the table 500. The modified code is then stored in the JSON column of the table 500 and propagated back to the object model, or more generally, the workflow project using the QuickPath.

In some embodiments, the code modifications specified in the instructions are converted into a format compatible with an executable version of a workflow project. The instructions may then be applied to the workflow project to modify the appropriate portions of code. In other examples, the code specified within the JSON field in the table 500 is converted using one or more APIs into executable code. This converted executable code is then applied to the appropriate portions of the executable version of the workflow project. In yet other examples, the complete modified typescript workflow project is converted into an intermediate model using an Authoring Framework API, which is then used to create an executable version of the workflow project. The intermediate model is created or operated at the intermediary processing engine 106 and specifies, for example, interfaces that link JSON code to C # code via an Authoring Framework API. After an intermediate model and executable version is created, the instructions and/or the modified typescript code within the table 500 may be used instead to update the intermediate model. The updates to the intermediate model are then propagated to the executable version of the workflow project. Alternatively, a new version of the executable version of the workflow project may be generated from the intermediate model.

III. Workflow Project Embodiments

Figure 6:
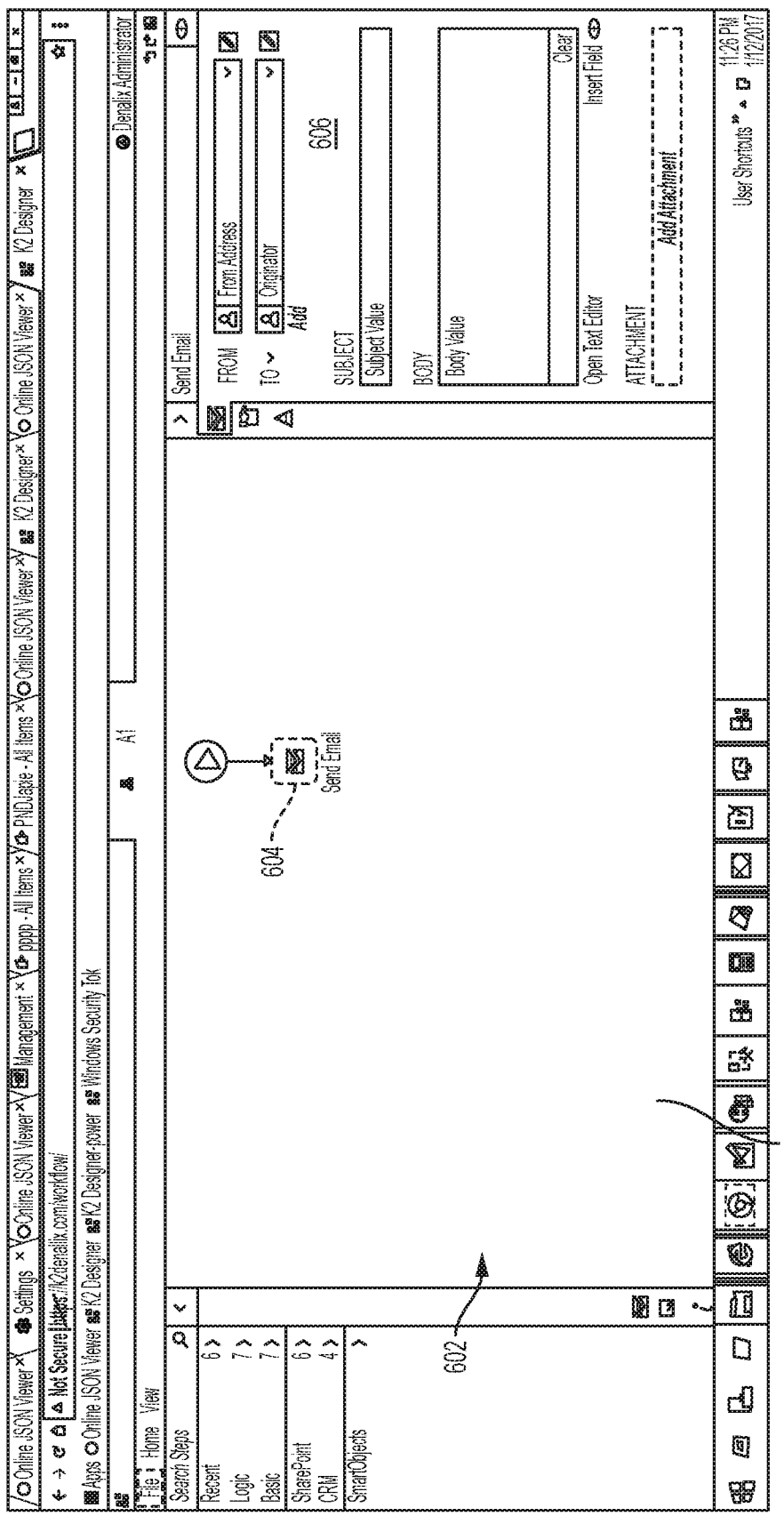
FIG. 6 shows a diagram of a canvas or editing workspace for a workflow project, which includes an email object (e.g., an object-orientated process having attributes and properties), according to an example embodiment of the present disclosure.

The following sections provide examples of executable and un-executable versions of a workflow project including underlying objects. FIG. 6 shows a diagram of an example canvas or editing workspace 201 for a workflow project 602, which includes a mail events object 604. The mail events object 604 specifies one or more processes that are defined by properties and/or attributes to cause a server or a computer to perform an operation. The properties and attributes are editable in section 606 of the editing workspace 201. In some embodiments, a toolset file determines how the properties and attributes of the object 604 are to be displayed within the section 606.

The example mail events object 604 causes one or more email messages to be transmitted to one or more recipients when executed within a workflow project that is defined by the workflow project 602. The properties or attributes of the email events object 604 define recipients (and/or originators) or point to a database of recipients and/or define contents of the email or link to a database (or other object) with the contents. The properties or attributes of the email events object 604 may also enable specification of conditions and/or time(s) email messages are to be transmitted. The section 606 enables users to graphically define properties or attributes by providing information one or more fields that are programmatically linked to the properties or attributes.

Figure 7:
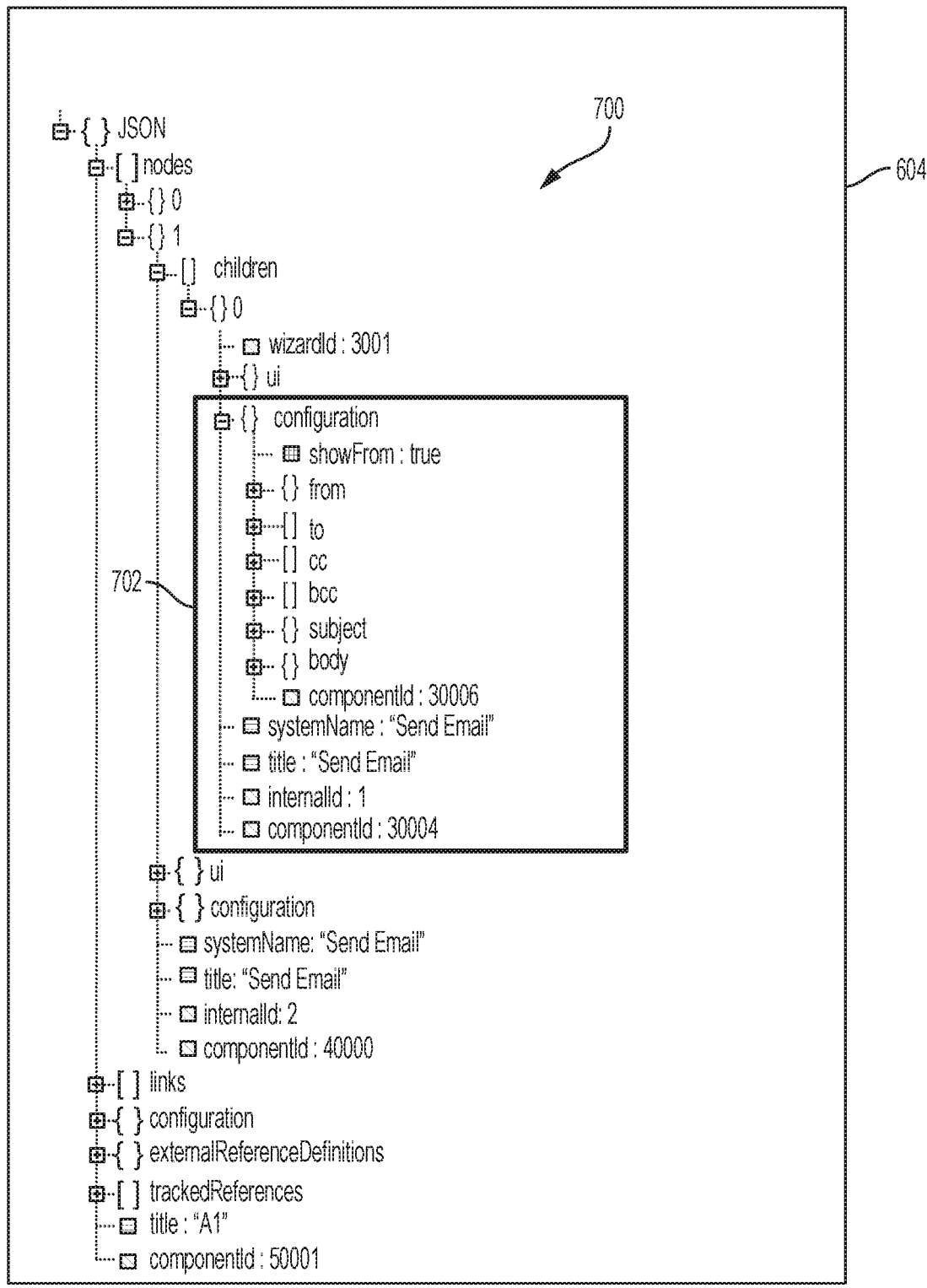
FIG. 7 shows a diagram of a JavaScript Object Notation ("JSON") object model of the email object of FIG. 6 at a client device, according to an example embodiment of the present disclosure.

FIG. 7 shows a diagram of a JSON object model 700 of the object 604 (including connected lines) of FIG. 6. The object model 700 includes properties and attributes 702 that define how processes or actions are performed by the email object 604. The JSON object model 700 includes editable properties and/or attributes including, for example, 'from', 'to', 'cc', 'bcc', 'subject', and 'body' attributes. The JSON model 700 also includes editable properties including a system name, title, internal id, and component id. Each of the properties and attributes may be edited by a user using through a graphical interface provided in the section 606, which includes tools for modifying the JSON object 604. Accordingly, edits provided by a user in section 606 are coded into the underlying JSON model 700. It should be appreciated that the JSON model 700 does not include capability for the email object 702 to be executed.

Figure 8:
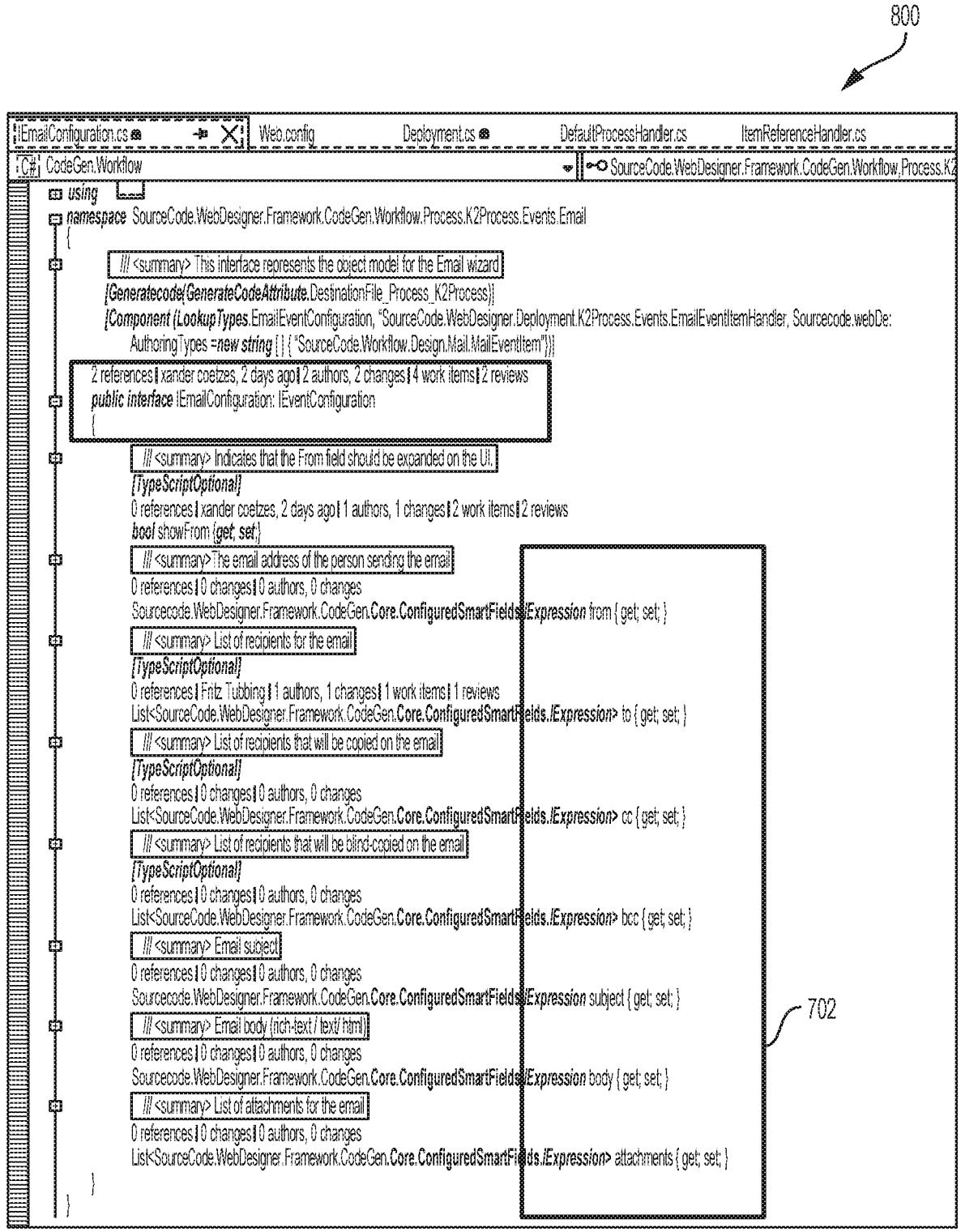
FIG. 8 shows a diagram of an interface that includes code specified in an intermediate model (e.g., one or more APIs) that defines how typescript (e.g., JSON) code translates or converts to C # code for an executable version of the email object of FIG. 6, according to an example embodiment of the present disclosure.

FIG. 8 shows a diagram of an interface 800 that includes code specified in an intermediate model (e.g., one or more Authoring Framework APIs) that specifies how typescript (e.g., JSON) code translates or converts to C # code for an executable version of the email object 604. The code specified in the interface 800 enables an executable version of the JSON model 700 of FIG. 7 to be created. One or more APIs specified within the interface 800 define relations between the C # executable code and the JSON model 700. For example, the 'from' attribute of the JSON model 700 is linked via an API within the interface 800 to executable C # code (managed by the processing server 102) that is associated with the comment: "The email address of the person sending the email". Thus, the 'from' attribute of the JSON model 700 provides an editable and viewable abstraction of the related executable code.

In some embodiments, templates may be used to create and/or modify the intermediate code shown in FIG. 8, the JSON model 700 of FIG. 7, and/or the C # class code. The templates may be used when a workflow project is newly created to provide an overall structure. Additionally or alternatively, the templates may define a code structure to enable correspondence to one or more APIs, shown for example in the interface 800. An example C # code template is provided below that is used to create an executable workflow project file.

```
/*
 * Generated code
 */
using System;
using System.Reflection;
@USINGSECTIONSTART
using @USINGNAMESPACE;@USINGSECTIONEND
using SourceCode.WebDesigner.Framework.ObjectModel.Core;
using SourceCode.WebDesigner.Framework.ObjectModel.Core.Collections;
using SourceCode.WebDesigner.Framework.ObjectModel.Core.Deployment;
using Newtonsoft.Json;
using Newtonsoft.Json.Linq;
using System.Diagnostics.CodeAnalysis;
namespace @NAMESPACE
{
@CLASSDOC
    [ComponentAttribute(@COMPONENTID)]
    public      class    @CLASSNAME@IFCLASSINHERITTENCE:
@CLASSINHERITTENCE@ENDIFCLASSINHERITTENCE
@WHERECLAUSESTART
            where    @GENERICNAME:   @ADDWHERECLASS
class,@ENDADDWHERECLASS @GENERICINTERFACE @ISGENERICNEW
new( ) @ENDISGENERICNEW
@WHERECLAUSEEND
    {
            @IFNOTBASECLASS
    /// <summary>
            /// Parent object for @SIMPLECLASSNAME
            /// </summary>
    [JsonIgnore]
            [SuppressMessage("Microsoft.Naming",
"CA1709:IdentifiersShouldBeCasedCorrectly", MessageId = "parent")]
        public @INCLUDENEWobject parent
            {
                get; set;
            }
            @ENDIFNOTBASECLASS
            /// <summary>
            /// Base constructor for @SIMPLECLASSNAME
            /// </summary>
            public @SIMPLECLASSNAME( )
        : base( )
    {
                this.InitializeComponent( );
    }
            /// <summary>
            /// Override constructor for @SIMPLECLASSNAME
            /// </summary>
            public   @ SIMPLECLASSNAME(ComponentController  controller,
object parent, JObject jsonObject)
            @IFBASECLASS:          base(controller,    parent,
jsonObject)@ENDIFBASECLASS
    {
                @IFNOTBASECLASS
                this.parent = parent;
                @ENDIFNOTBASECLASS
                @INCLUDECOMPLEXTYPECDI
                int cid;
                @ENDINCLUDECOMPLEXTYPECDI
                if (jsonObject != null) {
@CLASSINITIALIZESTART@IFSIMPLETYPE
                this.@ITEMNAME               =
((dynamic)jsonObject).@ITEMNAME      !=    null   ?
((dynamic)jsonObject).@ITEMNAME : this.GetDefaultValue("@ITEMNAME");
@ENDIFSIMPLETYPE@IFDICTIONARYTYPE
                this.@ITEMNAME               =
controller.CreateVariantDictionary<@VARIANTDICTIONARYITEMTYPE>(this,
((dynamic)jsonObject).@ITEMNAME);
@ENDIFDICTIONARYYPE@IFCOMPLEXENUMERABLETYPE
                this.@ITEMNAME               =
controller.CreateVariantList<@VARIANTLISTITEMTYPE>(this,
((dynamic)jsonObject).@ITEMNAME);
@ENDIFCOMPLEXENUMERABLETYPE@IFSIMPLEENUMERABLETYPE
                this.@ITEMNAME               =
((dynamic)jsonObject).@ITEMNAME      !=    null   ?
((JArray)((dynamic)jsonObject).@ITEMNAME).ToObject<@ITEMTYPE>( ) : new
@ITEMTYPE( );
@ENDIFSIMPLEENUMERABLETYPE@IFGENERICTYPE
```

-continued

```
                    this.@ITEMNAME                =
((dynamic)jsonObject).@ITEMNAME    !=    null    ?
controller.GetObject<@ITEMTYPE>(this, ((dynamic)jsonObject).@ITEMNAME) :
new @ITEMTYPE( );
@ENDIFGENERICTYPE@IFCOMPLEXTYPE
                    cid                            =
controller.GetComponentId(((dynamic)jsonObject).@ITEMNAME,
typeof(@ITEMTYPE));
                    if (cid > 0) {
                        this.@ITEMNAME            =
controller.GetObject<@ITEMTYPE>(this, ((dynamic)jsonObject).@ITEMNAME,
cid);
                    } else {
                        this.@ITEMNAME    =    new
@ITEMTYPE(controller, this, ((dynamic)jsonObject).@ITEMNAME);
                    }
@ENDIFCOMPLEXTYPE@CLASSINITIALIZEEND
@ENSURECOMPONENTID
        ComponentAttribute      cmpAtt              =
this.GetType( ).GetCustomAttribute<ComponentAttribute>( );
        if (cmpAtt != null)
        {
            this.componentId = cmpAtt.ComponentId;
        }
@ENDENSURECOMPONENTID
                } else {
                    this.InitializeComponent( );
                }
        }
            private void InitializeComponent( ) {
@CLASSINITIALIZESTART@IFSIMPLETYPEINIT
                this.@ITEMNAME = @ITEMDEFAULTVALUE;
@ENDIFSIMPLETYPEINIT@IFCOMPLEXTYPEINIT
                this.@ITEMNAME = new @ITEMTYPE( );
@ENDIFCOMPLEXTYPEINIT@CLASSINITIALIZEEND
@ENSURECOMPONENTID
        ComponentAttribute      cmpAtt              =
this.GetType( ).GetCustomAttribute<ComponentAttribute>( );
        if (cmpAtt != null)
        {
            this.componentId = cmpAtt.ComponentId;
        }
@ENDENSURECOMPONENTID
            }
            private dynamic GetDefaultValue(string propName)
    {
        Type t = this.GetType( ).GetProperty(propName).PropertyType;
        if (t.IsValueType) return Activator.CreateInstance(t);
        return null;
    }
@CLASSITEMSTART
@CLASSITEMDOC
            @CONTAINSUPPERCASE[SuppressMessage("Microsoft.Naming",
"CA1709:IdentifiersShouldBeCasedCorrectly",    MessageId        =
"@SECTIONITEM")]@ENDCONTAINSUPPERCASE
            @ISITEMTYPELIST[SuppressMessage("Microsoft.Usage",
"CA2227:CollectionPropertiesShouldBeReadOnly")]@ENDISITEMTYPELIST
        @IFDEFAULTVALUEHANDLING[JsonProperty("@SECTIONITEM",
DefaultValueHandling                                          =
DefaultValueHandling.Include)]@ENDIFDEFAULTVALUEHANDLING
            public @ITEMTYPE @ITEMNAME
            {
@IFSIMPLETYPE
                get;
@ENDIFSIMPLETYPE
@IFCOMPLEXTYPE
                get;
@ENDIFCOMPLEXTYPE
@IFSIMPLETYPE
                set;
@ENDIFSIMPLETYPE
@IFCOMPLEXTYPE
                set;
@ENDIFCOMPLEXTYPE
            }
@CLASSITEMEND
        }
}
```

An example typescript template is provided below that is used to create an un-executable workflow project file. The typescript template defines properties and attributes similar to the C # template that enables an object to be edited in a canvas. However, the typescript template does not provide code that is executable. In some embodiments, the example workflow converter 224 is configured to convert, for example, the above-C # template into the below typescript template using APIs that abstract the functional code into a graphical representation with editable properties. This enables an executable version of a workflow project to be created at the processing server 102 and converted into an un-executable version for editing at the client devices 110.

```
namespace @NAMESPACE {
        "use strict";
        export var @INTERFACESIMPLENAMENameSpace: string = "@NAMESPACE.@INTERFACESIMPLENAME";
        export var @INTERFACESIMPLENAMEImplementorName: string = "@NAMESPACE.@STATICCLASSNAME.implementor";
        export var @INTERFACESIMPLENAMEExporterName: ?string = "@NAMESPACE.@STATICCLASSNAME.exporter";
@INTERFACEDOC
        export interface @INTERFACENAME extends @EXTENDSINTERFACE {
@INTERFACEITEMSTART
@INTERFACEITEMDOC
                @ITEMNAME: @ITEMTYPE;
@INTERFACEITEMEND
        }
        var implementorExtenders: objectModel.core.model.IModelExtender[ ] = [ ];
        var exporterExtenders: objectModel.core.model.IModelExtender[ ] = [ ];
        function @INTERFACESIMPLENAMEImplementor(
            object: objectModel.core.model.ModelObject,
            objectPropName: string,
            genericsImplementors: { [name: string]: any }[ ],
            genericsExporters: { [name: string]: any }[ ],
            dataObject: any,
            parameter: any
        ): any {
@IMPLEMENTERITEMSTART
@IFARRAY
            object.createPublicArrayProperty("@IMPLEMENTEDITEMNAME", {
                    object: object,
                    propName: "@IMPLEMENTEDITEMNAME"
                },
            genericsImplementors.concat(@NAMESPACE.@STATICCLASSNAME.implementors),
            genericsExporters.concat(@NAMESPACE.@STATICCLASSNAME.exporters),
                    "@IMPLEMENTEDITEMTYPE",
                    @CUSTOMARRAYRESOLVERPROPERTY,
                    @CUSTOMARRAYRESOLVERLOOKUP,
                    @ISREFERENCETRACKINGARRAYSTART,
                    @ISEXTERNALDEFINITIONSCONTAINER,
                    @IGNOREEVENTS);
@ENDARRAY
@IFDICTIONARY
            object.createPublicDictionaryProperty("@IMPLEMENTEDITEMNAME", {
                    object: object,
                    propName: "@IMPLEMENTEDITEMNAME"
                },
            genericsImplementors.concat(@NAMESPACE.@STATICCLASSNAME.implementors),
            genericsExporters.concat(@NAMESPACE.@STATICCLASSNAME.exporters),
                    "@IMPLEMENTEDITEMTYPE",
                    @CUSTOMARRAYRESOLVERPROPERTY,
                    @CUSTOMARRAYRESOLVERLOOKUP,
                    @IGNOREEVENTS);
@ENDDICTIONARY
@IFOBJECT
            object.createPublicObjectProperty("@IMPLEMENTEDITEMNAME", {
                    object: object,
                    propName: "@IMPLEMENTEDITEMNAME"
                },
            genericsImplementors.concat(@NAMESPACE.@STATICCLASSNAME.implementors),
            genericsExporters.concat(@NAMESPACE.@STATICCLASSNAME.exporters),
                    "@IMPLEMENTEDITEMTYPE",
                    dataObject                              ?
```

```
(dataObject["@IMPLEMENTEDITEMNAME"] || { })["___customImplementor"] :
null,
                dataObject                              ?
(dataObject["@IMPLEMENTEDITEMNAME"] || { })["___customExporter"] :
null,
                @IGNOREEVENTS);
@ENDOBJECT
@IFENUMLOOKUP
        object.createPublicLookupProperty("@IMPLEMENTEDITEMNAME",
genericsImplementors.concat(@NAMESPACE.@STATICCLASSNAME.imple
mentors), "@IMPLEMENTEDITEMENUMTYPE");
@ENDENUMLOOKUP
@BINDERPROPERTY
        object.createPublicBinderProperty("@IMPLEMENTERLOCALITEMNA
ME",     "@IMPLEMENTEDITEMNAME",     "@RESOLVER",
@ISPROPREFERENCE, @CREATESETTER);
@ENDBINDERPROPERTY
@IFTRACKINGREFERENCE
        object.createPublicTrackingReferenceProperty("@IMPLEMENTEDITE
MNAME");
@ENDTRACKINGREFERENCE
@IFVALUE
        object.createPublicSimpleProperty("@IMPLEMENTEDITEMNAME",
                @IGNOREEVENTS);
@ENDVALUE
@IMPLEMENTERITEMEND
@IMPLEMENTERINTERFACEITEMSTART
            @INTERFACECALLER.implementor(
                object,
                objectPropName,
                [ @INTERFACESIMPLENAMEImplementors
].concat(genericsImplementors),
                [   @INTERFACESIMPLENAMEExporters
].concat(genericsExporters),
                dataObject,
                parameter
            );
@IMPLEMENTERINTERFACEITEMEND
        if (implementorExtenders && implementorExtenders.length) {
            for (var i: number = 0; i < implementorExtenders.length;
i++) {
                implementorExtenders[i](object,   dataObject,
parameter);
            }
        }
@COMPONENTIDSTART
            object["componentId"] = @COMPONENTIDVALUE;
@COMPONENTIDEND
        return object;
    }
    function @INTERFACESIMPLENAMEExporter(output: any, input: any,
genericsExpoters: { [name: string]: any }[ ], parameter: any): void {
@EXPORTERITEMSTART
@IFARRAY
        if     (input.@EXPORTEDITEMNAME&&
input.@EXPORTEDITEMNAME.length) {
            output.@EXPORTEDITEMNAME           =
input.@EXPORTEDITEMNAME.getJson( );
        }
@ENDARRAY
@IFDICTIONARY
        if     (input.@EXPORTEDITEMNAME&&
input.@EXPORTEDITEMNAME.length) {
            output.@EXPORTEDITEMNAME           =
input.@EXPORTEDITEMNAME.getJson( );
        }
@ENDDICTIONARY
@IFOBJECT
            if (input.@EXPORTEDITEMNAME) {
                var      tmp            =
input.@EXPORTEDITEMNAME.getJson(genericsExpoters.concat(@NAMESP
ACE.@STATICCLASSNAME.exporters), "@EXPORTEDITEMTYPE");
        if (tmp && Object.keys(tmp).length) {
                    output.@EXPORTEDITEMNAME = tmp;
                }
            }
```

```
@ENDOBJECT
@IFENUMLOOKUP
            if (input.@EXPORTEDITEMNAME) {
                output.@EXPORTEDITEMNAME         =
input.@EXPORTEDITEMNAME;
            }
@ENDENUMLOOKUP
@IFTRACKINGREFERENCE
            if (input.@EXPORTEDITEMNAME) {
                output.@EXPORTEDITEMNAME         =
input.@EXPORTEDITEMNAME;
            }
@ENDTRACKINGREFERENCE
@IFVALUE
            if       (input.@EXPORTEDITEMNAME&&
Object.getOwnPropertyDescriptor(input, "@EXPORTEDITEMNAME").set !==
undefined) {
                output.@EXPORTEDITEMNAME         =
input.@EXPORTEDITEMNAME;
            }
@ENDVALUE
@EXPORTERITEMEND
@EXPORTERINTERFACEITEMSTART
            @EXPORTCALLER.exporter(output,   input, [
@STATICCLASSNAME.exporters ].concat(genericsExpoters), parameter);
@EXPORTERINTERFACEITEMEND
            if (exporterExtenders && exporterExtenders.length) {
                for (var i: number = 0; i < exporterExtenderslength; i++) {
                    exporterExtenders[i](output, input, parameter);
                }
            }
        if (input["___customImplementor"]) output["___customImplementor"] =
input["___customImplementor"];
        if   (input["___customExporter"])   output["___customExportee"]   =
input["___customExporter"];
            sourceCode.k2Designer.objectModel.core.model.isRequiredPropsValid(o
utput, input, [
                @EXPORTERREQUIREDPROPERTIES
            ], false)
    }
        export class @STATICCLASSNAME {
        constructor( ) {
            return @STATICCLASSNAME.createInstance( );
        }
        public    static    get   implementor( ):
objectModel.core.model.IImplementorFunction {
            return @INTERFACESIMPLENAMEImplementor;
        }
        public static get exporter( ): objectModel.core.model.IExporterFunction {
            return @INTERFACESIMPLENAMEExporter;
        }
        public   static   get   implementors( ):   { [name:   string]:
objectModel.core.model.IImplementorFunction } {
            return @INTERFACESIMPLENAMEImplementors;
        }
        public   static   get   exporters( ):   { [name:   string]:
objectModel.core.model.IExporterFunction } {
            return @INTERFACESIMPLENAMEExporters;
        }
        public     static   extend(implementorExtender:
objectModel.core.model.IModelExtender,    exporterExtender:
objectModel.core.model.IModelExtender): void {
            if (implementorExtender) {
              implementorExtenders = implementorExtenders || [ ];
              implementorExtenders.push(implementorExtender);
            }
            if (exporterExtender) {
            exporterExtenders = exporterExtenders || [ ];
            exporterExtenders.push(exporterExtender);
            }
        }
```

```
    public static createInstance(config: @NEWINSTANCEINTERFACE = null,
parent: objectModel.core.model.IModelObjectParent = null, parameter: any =
null): @NEWINSTANCEINTERFACE{
        return
objectModel.core.model.ModelObject.createFrom<@NEWINSTANCEINTERF
ACE>(
            @INTERFACESIMPLENAMEImplementor,
@INTERFACESIMPLENAMEExporter, parent, config, parameter);
        }
    }
        export var @INTERFACESIMPLENAMEImplementors: { [name: string]:
any } = {
@IFNOTBASECLASSE
            "ModelBase": @IMPORTERMODELBASE.implementor,
@ENDIFNOTBASECLASSE
@IMPLEMENTORSSTART
            "@IMPORTEROREXPORTERNAME":
@IMPORTEROREXPORTERFUNCTION.implementor,
@IMPLEMENTOREND
        }
        export var @INTERFACESIMPLENAMEExporters : { [name: string]:
any } = {
@EXPORTERS START
            "@IMPORTEROREXPORTERNAME":
@IMPORTEROREXPORTERFUNCTION.exporter,
@EXPORTERSEND
        }
        objectModel.core.model.addImplementorExporterNameLookup(
        @INTERFACESIMPLENAMENameSpace,
            @INTERFACESIMPLENAMEImplementor,
            @INTERFACESIMPLENAMEExporter,
            implementorExtenders,
            exporterExtenders
            );
@IFISCOMPONENTOBJECT
        objectModel.core.model.componentLookup[@COMPONENTIDVALUE]
= {
                implementor: @INTERFACESIMPLENAMEImplementor,
                exporter: @INTERFACESIMPLENAMEExporter,
                implementorExtenders,
                exporterExtenders
            };
@ENDIFISCOMPONENTOBJECT
}
```

Figure 9:
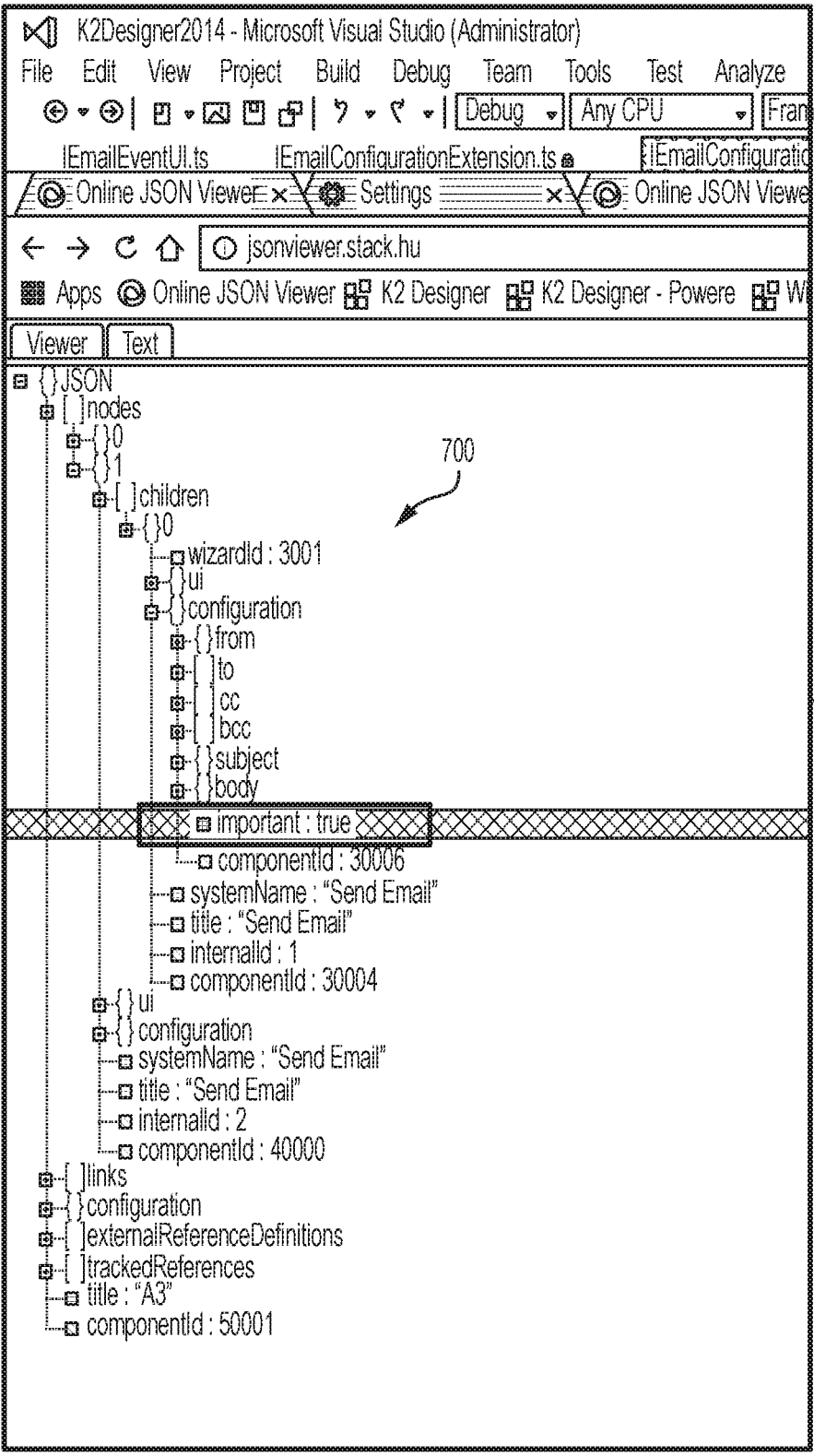
FIG. 9 shows a diagram of the JSON model of the email object of FIG. 6 being modified to include an 'important' property, according to an example embodiment of the present disclosure.

FIGS. 9 to 15 below illustrate a manner in which the email object 604 of workflow project 602 is modified at a first client device 110a, with the modification being propagated to other client devices 110 and the processing server 102. FIG. 9 shows a diagram of the JSON model 700 of the email object 604 of FIG. 6 being modified to include an 'important' property. To add the property, a user of a first client device 110a selects an 'important' field within the section 606 of editing workspace 201. Alternatively, the user may select from a drop-down list of available properties/attributes to add the 'important' flag. Once the 'important' flag has been added as a property to the email object 604, a user may specify the value of the property to 'true' or 'false'. The value is dependent upon if the email message generated by the email object 604 is to have a graphical icon indicative of the email's importance.

Figure 10:
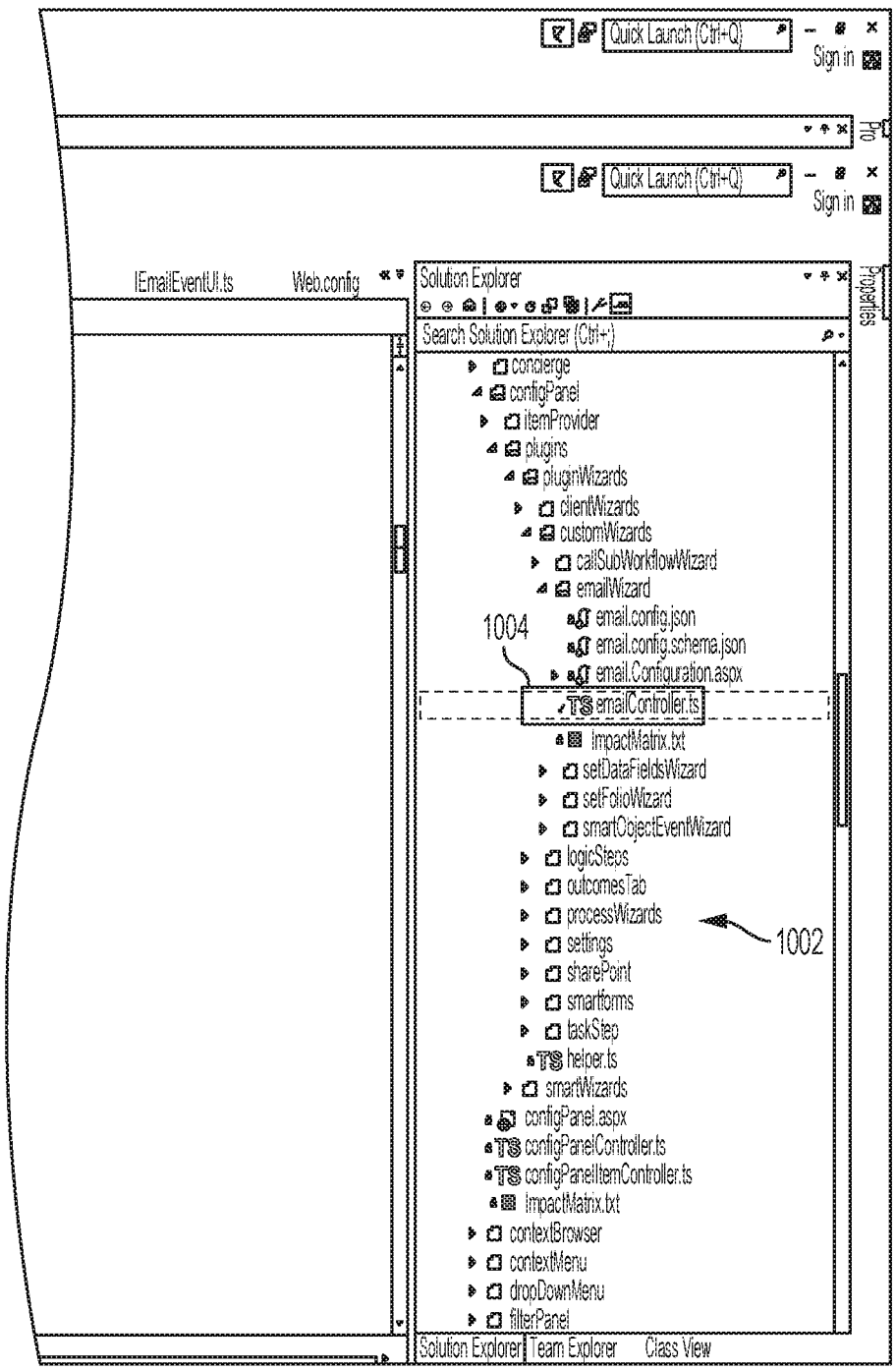
FIG. 10 shows a diagram of a code interface editor for adding the 'important' property to the JSON model of the email object of FIG. 6, according to an example embodiment of the present disclosure.
Figure 11:
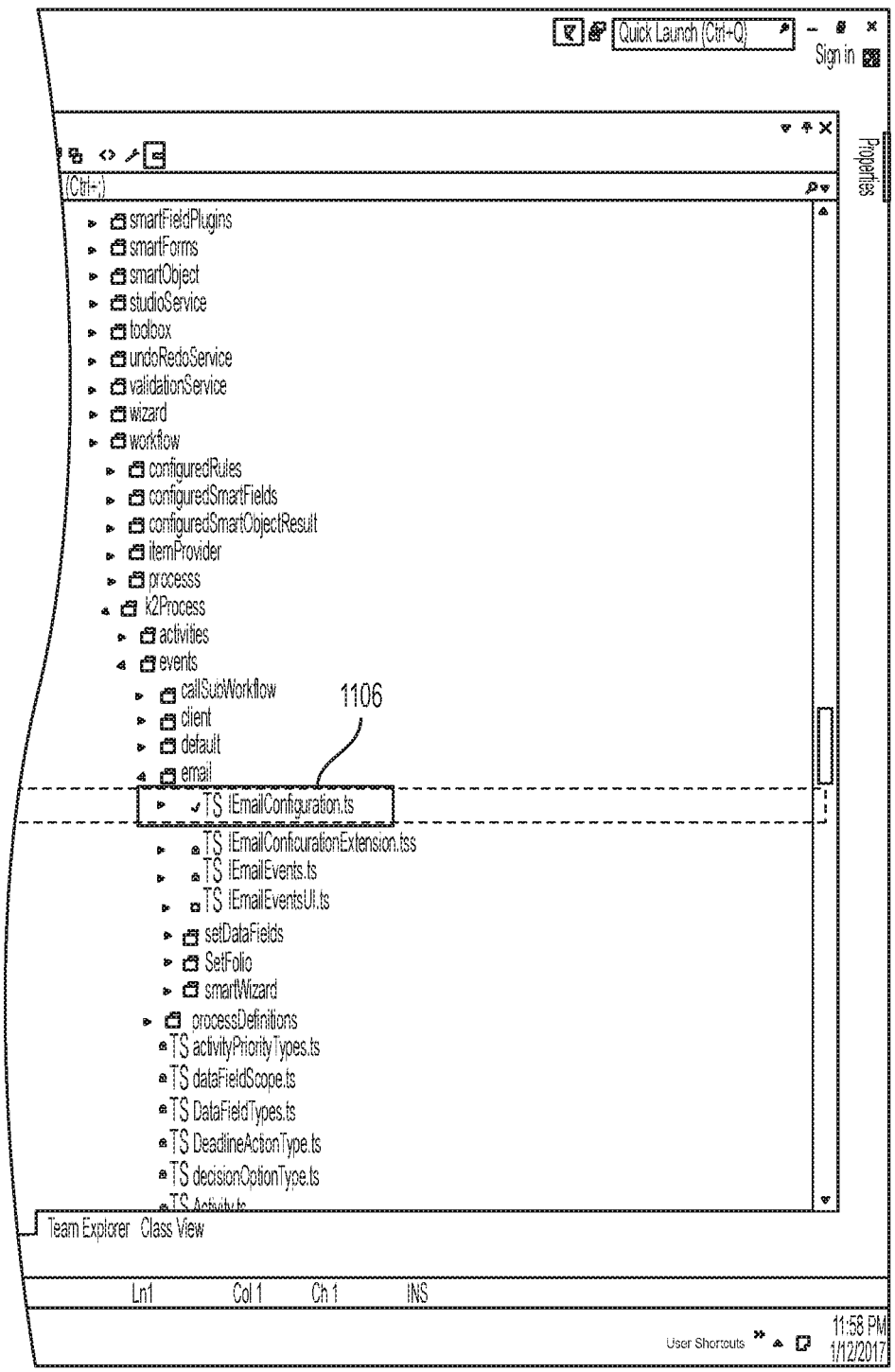
FIG. 11 shows a diagram of typescript code of the email object with the addition of the typescript code for the 'important' property, according to an example embodiment of the present disclosure.

In some other alternative embodiments, a user adds the 'important' property by opening a JSON editor. FIG. 10 shows a diagram of a code interface editor 1000 that is related to the editing workspace 201. In some examples, a toolset may provide a feature that shows typescript code that specifies the properties/attributes of objects of the workflow project 602. A user may access the editor 1000 to add new properties or attributes to an object. In the illustrated example, a user activates the 'important' property by opening a configuration panel 1002 and selecting a template or function of an email controller, as shown in box 1004. Selection of the template or function causes the code within the editor 1000 to be displayed, which corresponds to code for the email controller (e.g., code defining properties/attributes of the JSON model 700 of the email object 604). A user changes the typescript code shown in box 1006 to change from 'false' to 'true', which activates the 'important' property within the object. Programmatically, this may include the addition of typescript code for the 'important' property to the typescript code for the email object 604. FIG. 11 shows a diagram of the typescript code 1100 of the email object 604 with the addition of the typescript code for the 'important' property, as shown in box 1102. The displayed typescript code 1100 corresponds to an email configuration, shown in box 1104, of the email object 604. The 'important' property may be shown as a selectable field within the section 606 of FIG. 6. A user may then set the value of the 'important' property of the JSON model 700 of the email object 604 to be set from 'false' to 'true'.

At this point, the 'important' property and selected value is included within the email object 604 at the client device 110. The modification has not yet been made at other client devices 110 that are part of the same collaborative design session. In addition, the modification has not yet been made to an executable version of the workflow project 201 located at, for example, the processing server 102 and/or the memory 104. The propagation of the modification is made using at least one modification instruction. For example, after a user creates the 'important' property at the first client device 110*a*, the creation of the 'important' property is recorded in an instruction. As discussed in connection with FIGS. 4A and 4B, the instruction may include a QuickPath information, JSON information, a property/attribute name, and/or a property/attribute value that are indicative of the creation of the 'important' property. The instructions may be created by, for example, an operation of the toolset (e.g., the toolset 202) of the client device that codes typescript changes as instructions.

Figure 12:
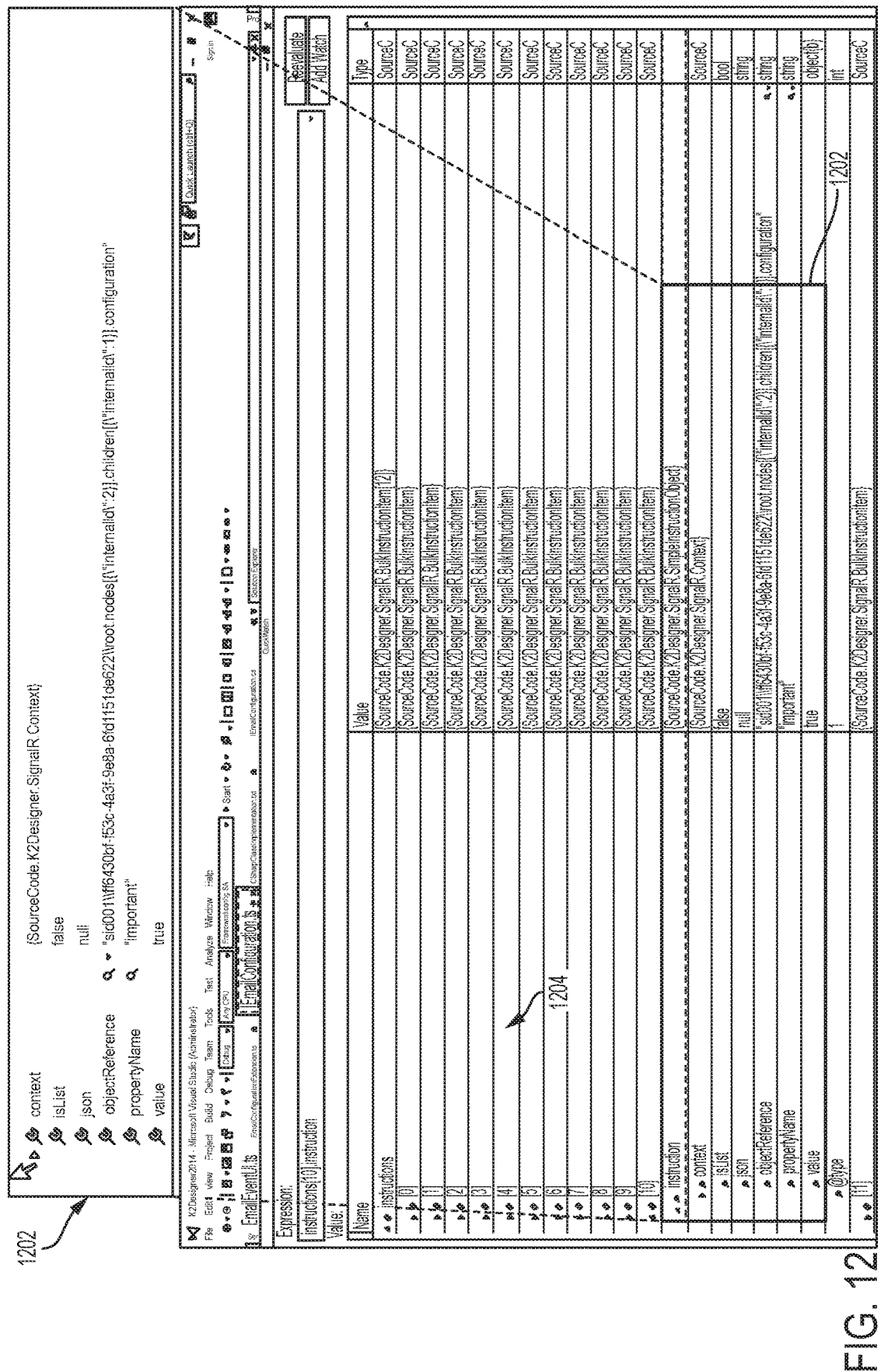
FIG. 12 shows a diagram of a table of instructions including an instruction specifying the addition of the typescript code for the 'important' property discussed in connection with FIGS. 10 and 11, according to an example embodiment of the present disclosure.

The modify instruction is transmitted by the first client device 110*a* to the intermediary processing engine 106 and/or any other device that includes a SignalR feature. As illustrated in FIG. 12, the intermediary processing engine 106 stores the instruction (shown as instruction 1202) to a queue of instructions (e.g., an instruction set), shown in table 1204. The table 1204 may include a SQL table stored in the memory 108. At a predetermined time (e.g., every 0.5 seconds, 1 second, 5 seconds, etc.), the instructions within the table 1204 are transmitted to the other client devices 110 that are part of the collaborative session.

Figure 13:
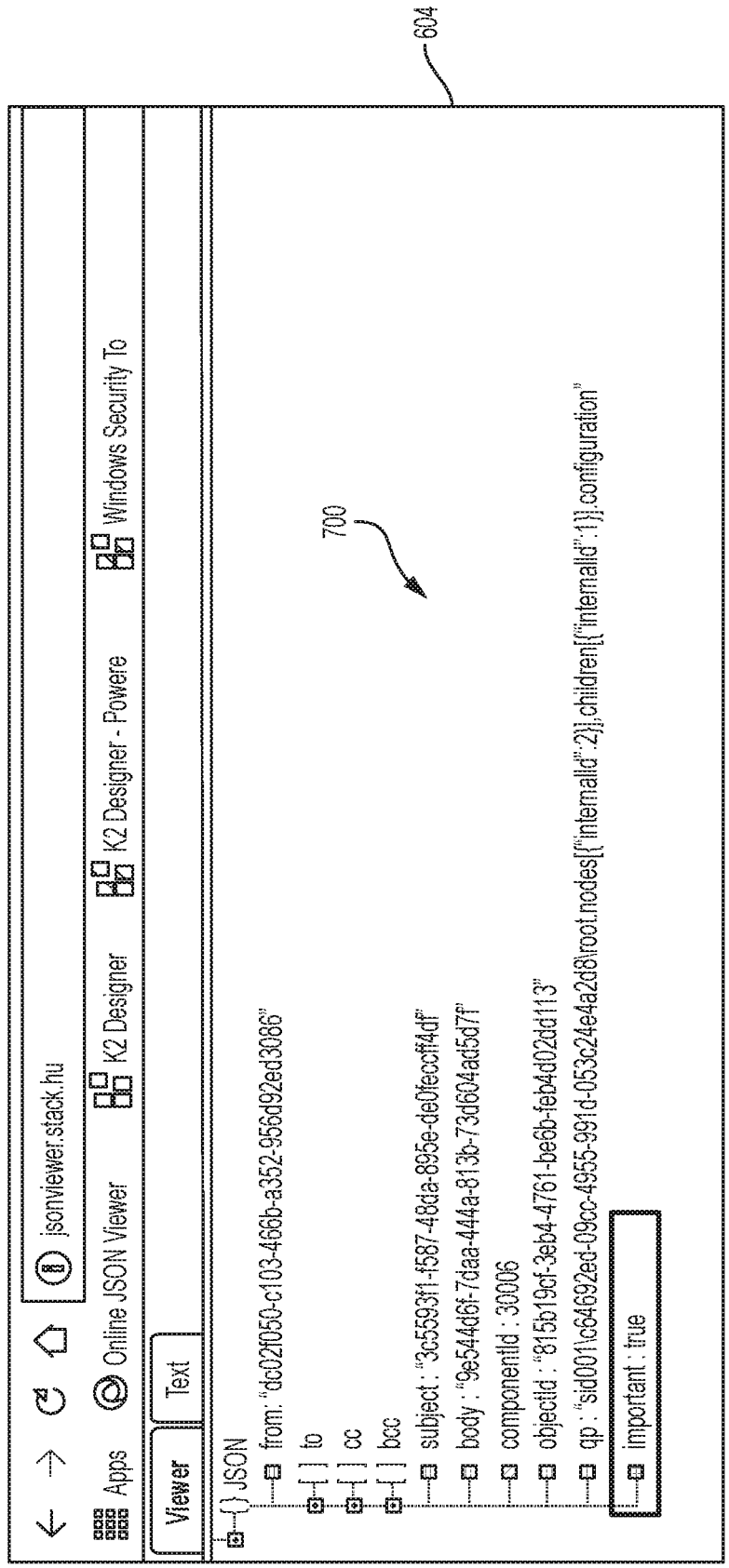
FIG. 13 shows a diagram of the 'important' property added to the JSON model of the email object at another client device, according to an example embodiment of the present disclosure.

In other instances, the instructions may be transmitted as soon as they are stored to the table 1204. In these other instances, the instructions (e.g., instructions 0 to 9) may have already been transmitted to the other client devices 110. Accordingly, the instruction 1202 is transmitted to the other client devices 110 after it is received by the intermediary processing engine 106 and/or stored to the table 1204 using, for example, SignalR. The toolsets at the other client devices 110 receive the instruction 1202, which is then applied to the typescript code of the local copy of the un-executable version of the workflow project 201, as described above in connection with FIGS. 4B and 5. FIG. 13 shows a diagram of the 'important' property added to the JSON model 700 of the email object 604 at one of the other client devices 110. A user of this client device 110 now has the ability to see that the email object 604 has an 'important' property, and the property is set to a value of 'true'. Accordingly, only changes made to an object model of a workflow project are transmitted among client devices instead of complete copies of the project. Further, the modification to the email object 604 is made without an explicit save command from a user, thereby enabling real-time collaboration among a plurality of devices.

In addition to the updating of the email object 604 at the client devices 110, the email object 604 is also updated at the intermediary processing server 102. This may include updating the executable version of the workflow project 602 and/or the un-executable version of the workflow project. In some embodiments, the intermediary processing engine 106 maintains a copy of the un-executable typescript version of the workflow project 602 within the memory 108. In addition, the intermediary processing engine 602 stores a copy of received instructions in the memory 108. Thus, when a new client device joins a collaborative session, the intermediary processing device 106 can transmit the un-executable version of the workflow project in addition to instructions to modify the project to reflect changes made during the collaborative design session.

Figure 14:
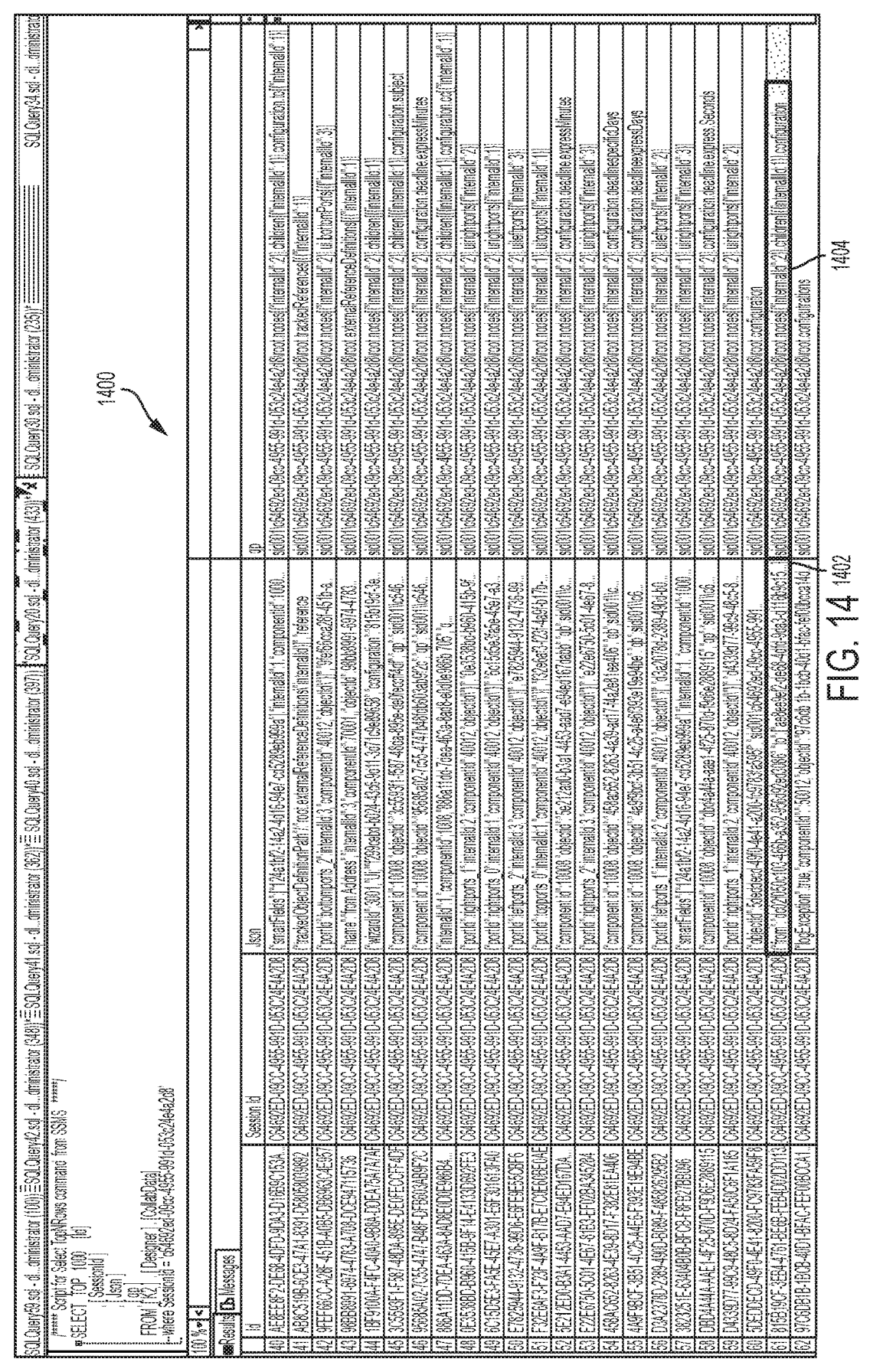

In other embodiments, the intermediary processing engine 106 periodically updates a copy of the un-executable version of the workflow project by applying the stored instructions. For example, the intermediary processing engine 106 uses a QuickPath of each instruction to identify a granular portion of typescript code of an object to be modified. The code, including the applied modification is stored to the table 1400, as shown in FIG. 14. Box 1402 shows the modification of the typescript code for the portion of the JSON model 700 of the email object 604 and box 1404 shows the corresponding QuickPath to add the 'important' property to the email object 604.

Figure 15:
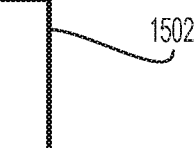
FIG. 15 shows a diagram of the interface of FIG. 8 with the addition of the 'important' property, according to an example embodiment of the present disclosure.
Figure 15:
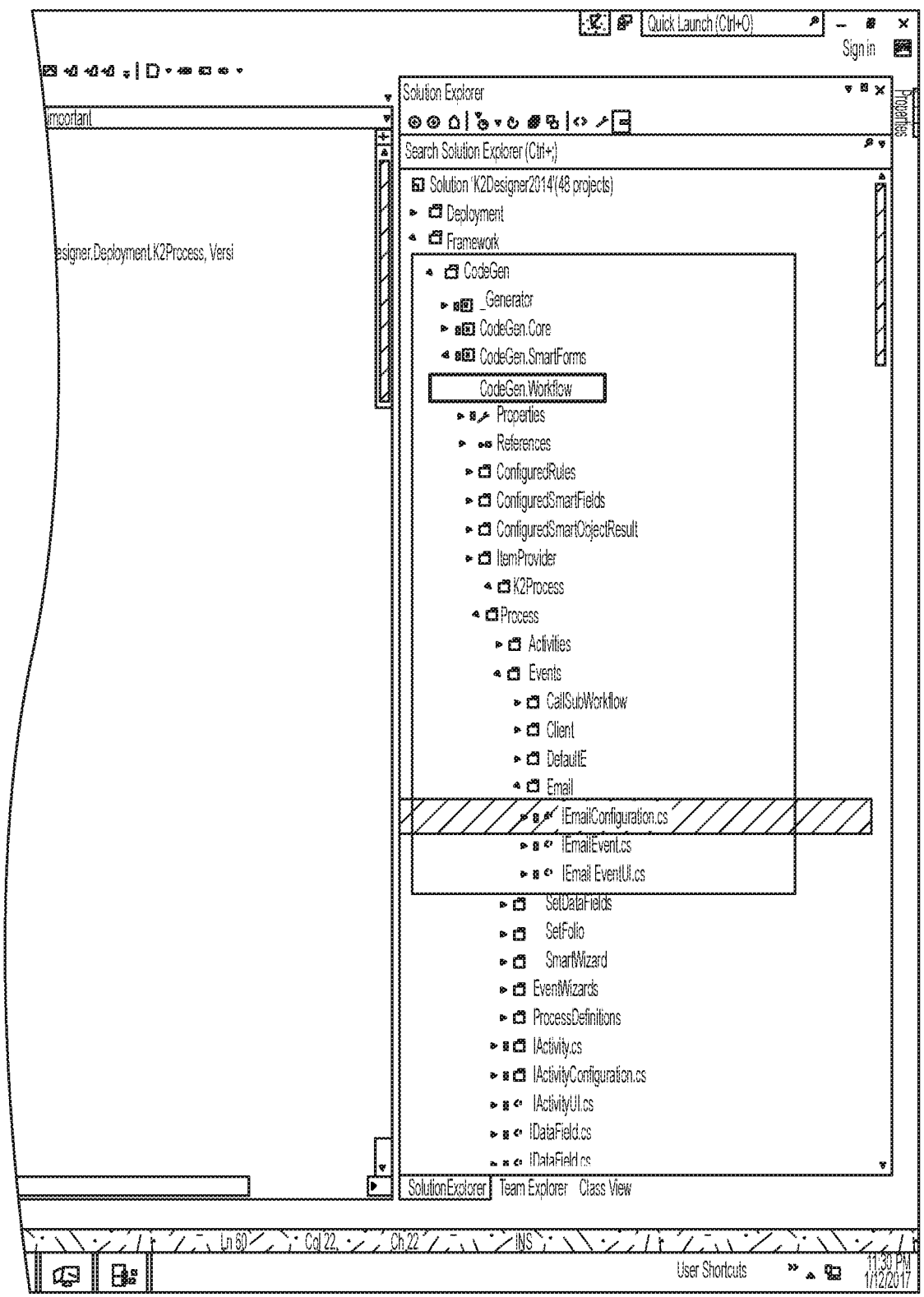

The example intermediary processing engine 106 is configured to communicate with the processing server 102 to update or generate a new version of the executable workflow project 602. In an embodiment, the modifications reflected in table 1400 are applied to an intermediate model or Authoring Framework API that specifies how JSON code is converted into C # code. FIG. 15 shows a diagram of the interface 800 of FIG. 8 with the addition of the 'important' property at box 1502. In this illustrated example, the intermediary processing engine 106 applies the code from box 1402 in table 1400 to the intermediate model shown in the interface 800. The intermediate model defines how, for example, JSON code is to be converted into an intermediate code or structure. The code within the box 1502 references the executable workflow project, such that a change or modification to the intermediate model causes a change at the executable workflow project. In other embodiments, the intermediary processing engine 106 generates a new executable workflow project from the modified intermediate model, with the APIs within the interface 800 being used with, for example one or more C # templates to define the C # code for the executable version of the workflow project 602. Once generated or updated, the executable version of the workflow project may then be executed at the processing server 102.

IV. Flowchart of the Example Process

Figure 16:
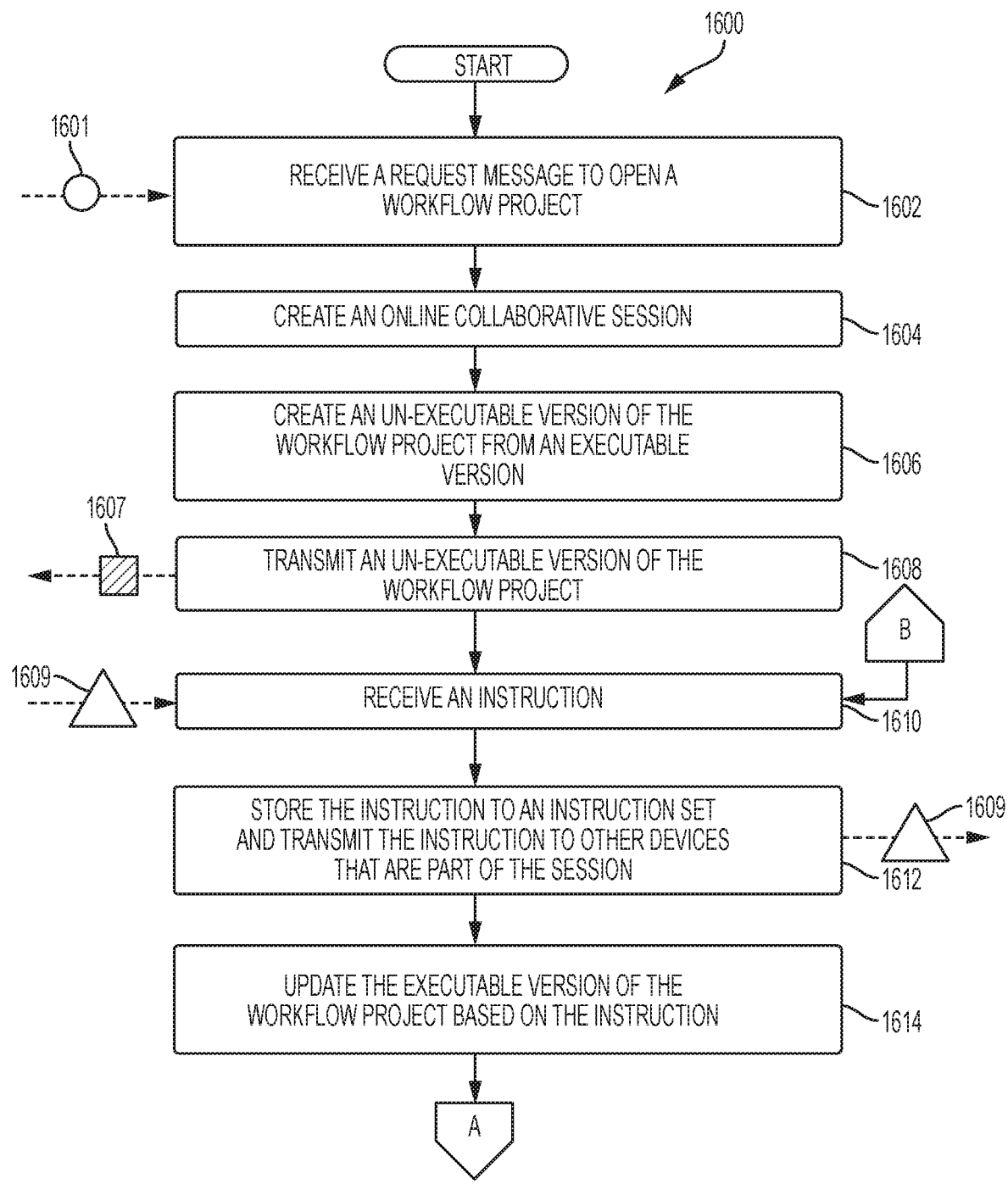
FIGS. 16 and 17 illustrate flow diagrams showing an example procedure to propagate modifications among executable and non-executable versions of a workflow project, according to an example embodiment of the present invention.
Figure 17:
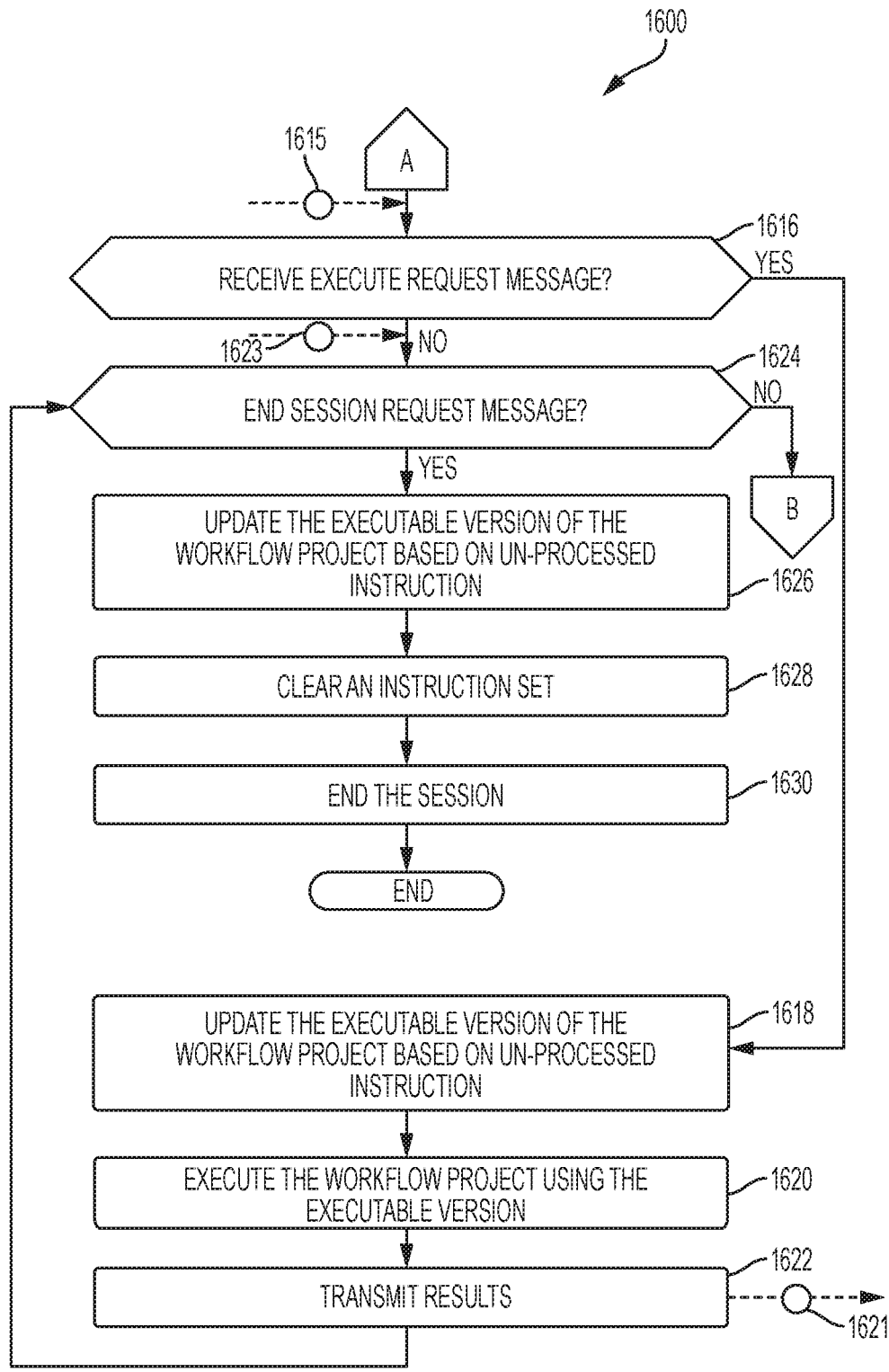

FIGS. 16 and 17 are flow diagrams showing an example procedure 1600, to propagate modifications among executable and non-executable versions of a workflow project, according to an example embodiment of the present invention. Although the procedure 1600 is described with reference to the flow diagram illustrated in FIGS. 16 and 17, it will be appreciated that many other methods of performing the acts associated with the procedure 1600 may be used. For example, the order of many of the blocks may be changed, certain blocks may be combined with other blocks, and many of the blocks described are optional. For example, additional blocks may be executed in embodiments where a user creates a new workflow project. Moreover, it should be appreciated that the example procedure 1600 is executed for each separate session hosted by the intermediary processing engine 106 and/or the processing server 102.

The example procedure 1600 operates on, for example, the intermediary processing engine 106 and/or the processing server 102 of FIGS. 1, 2A, 2B, and 2C. The procedure 1600 begins when the intermediary processing engine 106 receives a request message 1601 from a client device 110 requesting to view/edit a workflow project (block 1602). The request message 1601 may include a destination address, file name, identifier, and/or hyperlink to the workflow project. In some embodiments, the request message 1601 may include a selection made by a user operating a file browsing application on the client device 110. After the request message is received 1601, the example intermediary processing engine 106 creates an online collaborative design session (block 1604). The intermediary processing engine 106 may generate a session identifier and designate the requested workflow project as being part of the session. The intermediary processing engine 106 also identifies or creates an un-executable version of the workflow project for the client device (block 1606). In some embodiments, the intermediary processing engine 106 uses an intermediate model and/or Authoring Framework APIs to create the un-executable version of the workflow project from the executable version. As discussed above in connection with FIGS. 8 and 15, the intermediate model may specify how C # code is converted into JSON typescript code. In other embodiments, the intermediary processing engine 106 may instead access the memory 108 to retrieve the un-executable version of the workflow project stored from a previous session. After acquiring the un-executable version of the workflow project, the intermediary processing engine 106 transmits one or more messages 1607 to the client device 110 that comprise a copy of the un-executable version of the workflow project (block 1608). The intermediary processing engine 106 may also send one or more toolset files to enable editing of the workflow project.

During the online collaboration session, the client device 110 displays the un-executable version of the workflow project within an application, such as a web browser. Modifications to the workflow project are recorded in one or more instruction 1609 (e.g., the instruction 210 of FIG. 2A and/or the instruction 400 of FIG. 4A), which is received at the intermediary processing engine 106 (block 1610). The example intermediary processing engine 106 stores the received instruction(s) 1609 to an instruction set (block 1612) within, for example, the memory 108. The intermediary processing engine 106 also transmits the instruction 1609 and/or the instruction set to other client devices 110 that are part of the collaborative design session. Transmission of the instruction(s) 1609 may temporarily cause the client device 110 to prevent users from editing the same object until editing is complete by the originator of the instruction. In some examples, the intermediary processing engine 106 applies the instruction(s) 1609 to a local copy of the un-executable version of the workflow project, as discussed in connection with FIGS. 4B, 5, and 14. Further, the intermediary processing engine 106 applies the instruction(s) 1609 to the executable version of the workflow project using, for example, an intermediate model and/or Authoring Framework APIs (block 1614).

The example procedure 1600 continues in FIG. 17 where the intermediary processing engine 106 determines if an execute request message 1615 has been received from one of the client devices 110 within the session (block 1616). If the message 1615 has been received, the intermediary processing engine 106 applies any un-processed instructions to the executable version of the workflow project (block 1618). This action causes the executable version of the workflow project to reflect the current status of the workflow project as viewed by the users. The processing server 102 then executes the workflow project using the executable version (block 1620). The processing server 102 records results from the execution, which are then transmitted in one or more messages 1621 to the client devices 110 of the session via the intermediary processing engine 106 (block 1622). The results may comprise loading of data from one or more databases, outcomes from actions performed on data, a generation of new data, a generation of a new form, etc. The result contents of the messages 1621 are displayed in conjunction with the un-executable version of the workflow project at the client devices 110 to provide an appearance of a local execution of the workflow project. In some embodiments, the results are only transmitted to the client device 110 that requested the results.

After the results are transmitted, or if an execute request message is not received in block 1616, the intermediary processing engine 106 determines if a request message 1623 is received specifying that the session is to terminate (block 1624). The request message 1623 may be an explicit message from the client devices 110 or determined as client devices 110 leave a session. The intermediary processing engine 106 may internally generate the message 1623 after all client devices 110 have left the collaborative session.

After the message 1623 is received or generated, the intermediary processing engine 106 applies any un-processed instructions to the executable version of the workflow project (block 1626). The intermediary processing engine 106 may also apply any un-processed instructions to the local copy of the un-executable version of the workflow project stored in the memory 108. The intermediary processing engine 106 may then clear the instruction set or a table comprising instructions created during the session (block 1628). The intermediary processing engine 106 ends the session by discarding the session identifier and/or preventing modifications from being made to the workflow project (block 1630). The example procedure 1600 then ends.

V. Additional Features of the Example Collaboration Environment

In addition to the above-discussed features, the example intermediary processing engine 106 and/or the processing server 102 may be configured to perform the following features related to runtime processing of instructions, locking, security trimming, extensibility, and/or auditing. Regarding runtime, objects that are visually represented on a design canvas 201 are processed by an Authoring Framework API of the intermediary processing engine 106 and/or the processing server 102. This allows a collaborative process to not only result in visual representation that each client device 'sees' but also a declarative model that is fully able to be executed as a runtime. Workflows can be run, SmartObjects can be executed, and forms can be displayed.

Regarding locking, a user may select a property or attribute that locks certain portions (or locks completely) of an object or action from editing or viewing of one or more users. For example, an object may have seven properties locked, where the other remaining properties may be changed. In these situations, locked portions of an object, or more generally a workflow project, cannot be modified. The example intermediary processing engine 106 may lock a root object with inherited locked properties from other objects, etc. Locking may be recorded in instructions, which are sent to other client devices 110 to lock the corresponding object (e.g., 'this object is locked'). In an example regarding an email object, a client device can lock the email object down such that other client devices cannot change tabs. Other client devices can see the object but cannot interact with it.

Some instructions may allow for 'locking' down a dependency tree. For instance, a client device may configure a Step or Action within a workflow project. The Step implements a 'locking' interface and defines it at a 'Step' level. This ensures that only one client device can manipulate the object. The other client devices still process instructions for the object when they are received, but they cannot manipulate the same object. In another example, locking may be provided at more granularly for a single configuration page/tab on a Step on the process. It should be appreciated that locking can be done by either a separate instruction or via properties of the objects themselves. For example, a client device may receive an instruction to show a tab "visible=true" but the instruction is processed to 'lock' the tab so a user cannot make any changes. In this example, the client device receives the instruction to show a tab "visible=true" and 'locks' it because "lock=true".

The example intermediary processing engine 106 may also provide security locking where the instructions can specify security information. For instance, in addition to locking defined by the object interface on a client device 110, the intermediary processing engine 106 could implement a Security Trimmed locking as well. In an example, a client device possesses information indicative that a changed object is security trimmed and the current user does not have rights to the object. In this case the object would then be locked. Additionally, user interface obfuscation techniques can be applied to the objects that have been secured. This would allow a client device to show the objects on the canvas but 'blur' or 'dim' the attributes of those objects so any details about the object metadata, including the name, would not be known without a proper security level. Sub-process design patterns can be expanded with this functionality. A sub-process is typically used to 'hide' the 'secure' portions of the workflow design. Utilizing the obfuscation approach, this may not be necessary. The portions that need to be hidden can instead be marked as such and remain in the same processes layer.

Regarding extensibility, the example intermediary processing engine 106 abstracts instruction interfaces from the functionality of objects within a declarative model corresponding to an executable version of the objects. This enables other client devices to easily process the visualization of the objects, with editing provided through instructions. This configuration enables third-party applications to be integrated with or interact with the visualization of the workflow project. For example, a Skype® 'client application' could be built to notify a Skype user when a change is made via a designer—new step added, SmartObject property changed, etc. Additionally, although the intermediary processing engine 106 and/or the processing server 102 produce typescript and C # classes, the engine 106 and/or the server 102 can extend the types of generated objects to other languages, such as, Ruby or Python, thereby allowing for even greater extensibility with zero effort on the consuming client application. In these instances, the example intermediary processing engine 106 is configured to describe the objects via interfaces as before and a generator automatically creates the appropriate classes. These 'external' or third-party client applications can not only respond to the instructions but can also create their own instructions. For example, an Annotation block may be added to a design environment. This instruction is processed by a Skype® client application, which transmits a message to a user: "Please Provide Annotation for Mail Step". The user provides the annotation details via Skype®, which sends the instruction to be processed at the client devices 110 and/or the intermediary processing engine 106. For example, the designer canvas at a client device receives the instruction and the Annotation is updated on the screen. External client devices 110 and/or third-party applications will typically include a SignalR feature that is listening for an Instruction Type of Send Message. An additional filter can be applied to ensure a user only responds to certain or needed messages.

Regarding auditing, instructions are logged to temporary storage 108 (e.g., memory) for processing by the listening client devices—both designers as well as the declarative processing engines at the server 102. By default, not every instruction will result in permanent storage to a database, only those instructions necessary to rebuild the declarative model. Depending on capacity and load, the intermediary processing engine 106 may just transmit the messages through the instruction hub to the other client devices. The engine 106, the server 102, and/or another device may implement an auditing 'client' configured to log the details of every instruction to permanent storage allowing auditors to know exactly what steps were taken to build the resulting model. This can be interesting not only for auditors, but also for both usability and productivity improvements. For example, a simulator can be built to replay the instructions of multiple design sessions to understand how users use the tools to design their artifacts (Workflow, SmartObjects, Forms) to help build better training and potentially change how options are presented to the user. For example, the intermediary processing engine 106 or another server may determine through instruction data mining that every user incorrectly clicks three different tabs to find the text box that allows them to enter the Body for an email. The design expected the user to click on the From and To addresses first but the data shows that >80% start with the Body first so the toolset should be changed to highlight this more intuitively. The intermediary processing engine 106 may be configured to ensure data exchange sizes, latency, storage sizes, etc. could all be tweaked.

The example intermediary processing engine 106 may also be configured to provide support processes. For example, the engine 106 may provide multiple ways to share a link to a collaborative session: copy/paste in a chat window, send email to user or multiple users, click a Request Collaboration button and have the system transmit the link to another client device, etc. This enables a support person to join the same collaborative session as the customer/partner who is struggling and get real-time support building the same process.

Aspects of the Example Collaborative Design Systems, Apparatuses, and Methods

Aspects of the subject matter described herein may be useful alone or in combination with one or more other aspect described herein. Without limiting the foregoing description, in a first aspect of the present disclosure, a collaborative design apparatus comprises a persistent memory configured to store an executable version of a workflow project, the workflow project including at least one executable version of an object-orientated process having attributes and properties. The collaborative design apparatus also includes a model processing server configured to compile and execute the workflow project based on the attributes and properties of the executable version of object-orientated process. The collaborative design apparatus further includes an abstraction interface configured to define a mapping between (i) the executable version of the object-orientated process and a typescript version of the object-orientated process including related attributes and properties, and (ii) the executable version of the workflow project and a typescript version of the workflow project. The typescript version of the object-orientated process and the typescript version of the workflow project being compatible to be displayed in a web browser. The collaborative design apparatus additionally includes an intermediary processing engine configured to transmit the typescript version of the object-orientated process and the typescript version of the workflow project to a first client device for display in the web browser of the first client device and a second client device for display in the web browser of the second client device, transmit a toolset file to the first client device and the second client device, the toolset file specifying a user interface to enable modification of the typescript version of the object-orientated process and the typescript version of the workflow project, receive, from the first client device, a modify instruction to modify at least one of the attributes or properties of the typescript version of the object-orientated process, store the modify instruction in conjunction with the typescript version of the object-orientated process, and transmit the modify instruction to the second client device causing the user interface to modify the at least one of the attributes or properties of the typescript version of the object-orientated process displayed within the user interface at the second client device. Wherein, the typescript version of the object-orientated process is concurrently displayed, at the first client device and the second client device, with the modification of the at least one of the attributes or properties.

In accordance with a second aspect of the present disclosure, which may be used in combination with any other aspect listed herein unless stated otherwise, the model processing server is configured to receive the modify instruction and update the executable version of the object-orientated process based on the modify instruction.

In accordance with a third aspect of the present disclosure, which may be used in combination with any other aspect listed herein unless stated otherwise, the model processing server is configured to receive an execution instruction to execute the workflow project, execute the updated executable version of the object-orientated process within the executable version of the workflow project to generate a result of the workflow project, and transmit the result concurrently to the first client device and the second client device for display within the respective user interface.

In accordance with a fourth aspect of the present disclosure, which may be used in combination with any other aspect listed herein unless stated otherwise, the instruction to execute the workflow project is received from at least one of the first client device, the second client device, and a third client device.

In accordance with a fifth aspect of the present disclosure, which may be used in combination with any other aspect listed herein unless stated otherwise, the modification of at least one of the attributes or properties of the typescript version of the object-orientated process includes at least one of a property to enable, a property to disable, a value of a property, a value of an attribute, a field to be added, an activity to be added, an activity to be edited, a creation of a link to another object-orientated process, and a modification of a link to another object-orientated process.

In accordance with a sixth aspect of the present disclosure, which may be used in combination with any other aspect listed herein unless stated otherwise, the toolset file specifies options of modifying the object-orientated process and options for creating additional object-orientated process within the workflow project.

In accordance with a seventh aspect of the present disclosure, which may be used in combination with any other aspect listed herein unless stated otherwise, the toolset file specifies plug-in operations for the web browser of the first client device and the second client device.

In accordance with an eighth aspect of the present disclosure, which may be used in combination with any other aspect listed herein unless stated otherwise, the intermediary processing engine is configured to store the modify instruction to the persistent memory.

In accordance with a ninth aspect of the present disclosure, which may be used in combination with any other aspect listed herein unless stated otherwise, the object-orientated process includes at least one of (i) attributes and properties related to defined data, and (ii) one or more actions or methods with regard to the defined data.

In accordance with a tenth aspect of the present disclosure, which may be used in combination with any other aspect listed herein unless stated otherwise, the object-orientated process includes at least one of a business object, a business process, a rule, a form, and a workflow.

In accordance with an eleventh aspect of the present disclosure, which may be used in combination with any other aspect listed herein unless stated otherwise, the modify instruction is transmitted to the second client device within a JSON payload.

In accordance with a twelfth aspect of the present disclosure, which may be used in combination with any other aspect listed herein unless stated otherwise, the typescript version of the object-orientated process includes a JSON model object.

In accordance with a thirteenth aspect of the present disclosure, which may be used in combination with any other aspect listed herein unless stated otherwise, a collaborative design method includes receiving, in a server, a first request message from a first client device requesting a workflow project, receiving, in the server, a second request message from a second client device requesting the workflow project, and creating, via the server, a typescript version of the workflow project from an executable version of the workflow project. The example method also includes transmitting, from the server, a first copy of the typescript version of the workflow project to the first client device and a second copy of the typescript version of the workflow project to the second client device, receiving, in the server from the first client device, a modify instruction that is indicative of a modification to the first copy of the typescript version of the workflow project, and transmitting, from the server, the modify instruction to the second client device causing the second client device to modify the second copy of the typescript version of the workflow project. The example method further includes modifying, via the server, the executable version of the workflow project based on the modify instruction.

In accordance with a fourteenth aspect of the present disclosure, which may be used in combination with any other aspect listed herein unless stated otherwise, the first request message and the second request message include at least one of an address, a hyperlink, or a file name of the workflow project.

In accordance with a fifteenth aspect of the present disclosure, which may be used in combination with any other aspect listed herein unless stated otherwise, the method further comprises receiving, in the server from the first client device, an execution message requesting an execution of the workflow project, executing, via the server, the modified executable version of the workflow project to generate a result, and transmitting, from the server, the result to the first client device for display in connection with the first copy of the typescript version of the workflow project.

In accordance with a sixteenth aspect of the present disclosure, which may be used in combination with any other aspect listed herein unless stated otherwise, the method further comprises transmitting, from the server, the result concurrently to the second client device for display in connection with the second copy of the typescript version of the workflow project.

In accordance with a seventeenth aspect of the present disclosure, which may be used in combination with any other aspect listed herein unless stated otherwise, the workflow project includes an executable version of an object-orientated process having attributes and properties, and the typescript version of the workflow project includes an un-executable version of the object-orientated process with editable attributes and properties.

In accordance with an eighteenth aspect of the present disclosure, which may be used in combination with any other aspect listed herein unless stated otherwise, creating the typescript version of the workflow project from the executable version of the workflow project includes applying at least one abstraction interface to that defines a mapping between the object-orientated process, including the attributes and properties to the typescript version of the object-orientated process including the editable attributes and properties.

In accordance with a nineteenth aspect of the present disclosure, which may be used in combination with any other aspect listed herein unless stated otherwise, the first copy of the typescript version of the workflow project is transmitted for display within a first web browser of the first client device and the first copy of the typescript version of the workflow project is transmitted for display within a second web browser of the second client device.

In accordance with a twentieth aspect of the present disclosure, which may be used in combination with any other aspect listed herein unless stated otherwise, the method further comprises transmitting, from the server, a toolset file to the first client device and the second client device, the toolset file specifying a user interface to enable modification of the typescript version of the workflow project.

In accordance with a twenty-first aspect of the present disclosure, any of the structure and functionality illustrated and described in connection with FIGS. 1 to 17 may be used in combination with any of the structure and functionality illustrated and described in connection with any of the other of FIGS. 1 to 17 and with any one or more of the preceding aspects.

Conclusion

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A collaborative design apparatus comprising:
a persistent memory configured to store an executable version of an object-orientated process having attributes and properties,
a model processing server configured to compile and execute a workflow project based on the attributes and properties of the executable version of the object-orientated process;
an abstraction interface configured to define a mapping between the executable version of the object-orientated process and an un-executable version of the object-orientated process including related attributes and properties, wherein the un-executable version of the object-orientated process is compatible to be displayed in a web browser; and
an intermediary processing engine configured to:
transmit the un-executable version of the object-orientated process to a first client device for display in the web browser of the first client device and a second client device for display in the web browser of the second client device,
transmit a toolset file to the first client device and the second client device, the toolset file specifying a user interface to enable modification of the un-executable version of the object-orientated process,
receive, from the first client device, a modify instruction to modify at least one of the attributes or properties of the un-executable version of the object-orientated process, and
store the modify instruction in conjunction with the un-executable version of the object-orientated process,
wherein the model processing server is configured to update the executable version of the object-orientated process based on the modify instruction.

2. The collaborative design apparatus of claim 1, wherein the intermediary processing engine is configured to transmit the modify instruction to the second client device causing the user interface to modify the at least one of the attributes or properties of the un-executable version of the object-orientated process displayed within the user interface at the second client device,
wherein the un-executable version of the object-orientated process is concurrently displayed, at the first client device and the second client device, with the modification of the at least one of the attributes or properties.

3. The collaborative design apparatus of claim 2, wherein the modify instruction is transmitted to the second client device within a JavaScript Object Notation ("JSON") payload.

4. The collaborative design apparatus of claim 1, wherein the model processing server is configured to:
receive an execution instruction to execute the workflow project;
execute the updated executable version of the object-orientated process to generate a result of the workflow project; and
transmit the result concurrently to the first client device and the second client device for display within the respective user interface.

5. The collaborative design apparatus of claim 1, wherein the modification of at least one of the attributes or properties of the un-executable version of the object-orientated process includes at least one of a property to enable, a property to disable, a value of a property, a value of an attribute, a field to be added, an activity to be added, an activity to be edited, a creation of a link to another object-orientated process, and a modification of a link to another object-orientated process.

6. The collaborative design apparatus of claim 1, wherein the toolset file specifies options of modifying the object-orientated process and options for creating additional object-orientated process within the workflow project.

7. The collaborative design apparatus of claim 1, wherein the toolset file specifies plug-in operations for the web browser of the first client device and the second client device.

8. The collaborative design apparatus of claim 1, wherein the object-orientated process includes at least one of a business object, a business process, a rule, a form, and a workflow.

9. The collaborative design apparatus of claim 1, wherein the un-executable version of the object-orientated process is provided in at least one of TypeScript, eXtensible Markup Language ("XML"), HyperText Markup Language ("HTML"), JavaScript, or a Cascading Style Sheet ("CSS").

10. A collaborative design method comprising:
compiling, via a model processing server, a workflow project based on attributes and properties of an executable version of an object-orientated process;
defining, via an abstraction interface, a mapping between the executable version of the object-orientated process and an un-executable version of the object-orientated process including related attributes and properties, wherein the un-executable version of the object-orientated process is compatible to be displayed in a web browser;
transmitting, from an intermediary processing engine, the un-executable version of the object-orientated process to a first client device for display in the web browser of the first client device and a second client device for display in the web browser of the second client device;
transmitting, from the intermediary processing engine, a toolset file to the first client device and the second client device, the toolset file specifying a user interface to enable modification of the un-executable version of the object-orientated process;
receiving, in the intermediary processing engine from the first client device, a modify instruction to modify at least one of the attributes or properties of the un-executable version of the object-orientated process;
storing, via the intermediary processing engine, the modify instruction in conjunction with the un-executable version of the object-orientated process; and
updating, via the model processing server, the executable version of the object-orientated process based on the modify instruction.

11. The method of claim 10, further comprising, storing, in a persistent memory, the executable version of the object-orientated process including the attributes and properties.

12. The method of claim 10, wherein the intermediary processing engine, the abstraction interface, and the model processing server are hosted on a server.

13. The method of claim 10, wherein the toolset file specifies plug-in operations for the web browser of the first client device and the second client device.

14. The method of claim 10, further comprising:
transmitting, from the intermediary processing engine to the second client device, the modify instruction causing the user interface to modify the at least one of the attributes or properties of the un-executable version of the object-orientated process displayed within the user interface at the second client device,
wherein the un-executable version of the object-orientated process is concurrently displayed, at the first client device and the second client device, with the modification of the at least one of the attributes or properties.

15. The method of claim 14, wherein the modify instruction is transmitted to the second client device within a JSON JavaScript Object Notation ("JSON") payload.

16. The method of claim 10, further comprising:
receiving, in the model processing server, an execution instruction to execute the workflow project;
executing, via the model processing server, the updated executable version of the object-orientated process to generate a result of the workflow project; and
transmitting, from the model processing server, the result concurrently to the first client device and the second client device for display within the respective user interface.

17. The method of claim 10, wherein the modification of at least one of the attributes or properties of the un-executable version of the object-orientated process includes at least one of a property to enable, a property to disable, a value of a property, a value of an attribute, a field to be added, an activity to be added, an activity to be edited, a creation of a link to another object-orientated process, and a modification of a link to another object-orientated process.

18. The method of claim 10, wherein the toolset file specifies options of modifying the object-orientated process and options for creating additional object-orientated process within the workflow project.

19. The method of claim 10, wherein the object-orientated process includes at least one of a business object, a business process, a rule, a form, and a workflow.

20. The method of claim 10, wherein the un-executable version of the object-orientated process is provided in at least one of TypeScript, eXtensible Markup Language ("XML"), HyperText Markup Language ("HTML"), JavaScript, or a Cascading Style Sheet ("CSS").

* * * * *